US012342294B2

(12) United States Patent
Wigren

(10) Patent No.: US 12,342,294 B2
(45) Date of Patent: Jun. 24, 2025

(54) COORDINATED CONTROL OF AVERAGE EIRP

(71) Applicant: Telefonaktiebolaget LM Ericsson (publ), Stockholm (SE)

(72) Inventor: Torbjörn Wigren, Uppsala (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 436 days.

(21) Appl. No.: 17/995,305

(22) PCT Filed: May 11, 2020

(86) PCT No.: PCT/SE2020/050478
§ 371 (c)(1),
(2) Date: Sep. 30, 2022

(87) PCT Pub. No.: WO2021/230777
PCT Pub. Date: Nov. 18, 2021

(65) Prior Publication Data
US 2023/0156629 A1    May 18, 2023

(51) Int. Cl.
*H04W 52/36* (2009.01)
*H04W 52/08* (2009.01)
*H04W 52/14* (2009.01)

(52) U.S. Cl.
CPC ......... *H04W 52/367* (2013.01); *H04W 52/08* (2013.01); *H04W 52/143* (2013.01)

(58) Field of Classification Search
CPC . H04W 52/367; H04W 52/08; H04W 52/143; H04W 52/22
See application file for complete search history.

(56) References Cited

U.S. PATENT DOCUMENTS

| 8,918,135 B2 | 12/2014 | Park et al. | |
| 2007/0046539 A1* | 3/2007 | Mani | H04B 7/0691 342/383 |
| 2017/0117950 A1 | 4/2017 | Strong | |

FOREIGN PATENT DOCUMENTS

| WO | 2018056876 A1 | 3/2018 |
| WO | 2019194714 A1 | 10/2019 |

(Continued)

OTHER PUBLICATIONS

International Search Report and Written Opinion for Application No. PCT/SE2020/050478, dated Mar. 25, 2021, 12 pages.

(Continued)

*Primary Examiner* — Jamal Javaid
(74) *Attorney, Agent, or Firm* — Nicholson De Vos Webster & Elliott LLP

(57) ABSTRACT

A mechanism for average Equivalent Isotropic Radiated Power (EIRP) control of at least two radio signal paths. A method is performed by a coordinating controller of a site. The site comprises the at least two radio signal paths. The method comprises obtaining, from inner controllers of the radio signal paths, information of long-term time averaged incoming and outgoing traffic per radio signal path. The method comprises determining a time varying reference value of average transmission power per radio signal path based on equalizing terms determined from the information of long-term time averaged incoming and outgoing traffic, antenna gain information per radio signal path, and a condition on total average EIRP for the site. The method comprises performing individual average EIRP control per radio signal path by providing to each respective inner controller, the time varying reference value determined for the radio signal path controlled by that inner controller.

20 Claims, 13 Drawing Sheets

(56) References Cited

FOREIGN PATENT DOCUMENTS

| WO | 2019194719 A1 | 10/2019 |
| WO | 2019194721 A1 | 10/2019 |
| WO | 2020197455 A1 | 10/2020 |
| WO | 2020210971 A1 | 10/2020 |
| WO | 2020222682 A1 | 11/2020 |
| WO | 2020239214 A1 | 12/2020 |
| WO | 2021049982 A1 | 3/2021 |
| WO | 2021069953 A1 | 4/2021 |

OTHER PUBLICATIONS

International Preliminary Report on Patentability for Application No. PCT/SE2020/050478, dated Nov. 24, 2022, 9 pages.
Office Action, IN App. No. 202247070282, Jan. 28, 2025, 05 pages.

* cited by examiner

COORDINATED CONTROL OF AVERAGE EIRP

CROSS-REFERENCE TO RELATED APPLICATIONS

This application is a National stage of International Application No. PCT/SE2020/050478, filed May 11, 2020, which is hereby incorporated by reference.

TECHNICAL FIELD

Embodiments presented herein relate to methods, a coordinating controller, an inner controller, computer programs, and a computer program product for average EIRP control of at least one radio signal path.

BACKGROUND

When any radio equipment is to be deployed, regulatory radio frequency (RF) electromagnetic field (EMF) exposure requirements should be accounted for. These RF EMF exposure regulations may typically be based on the guidelines from the International Commission on Non-Ionizing Radiation Protection (ICNIRP) but may take different forms in some countries and regions. The aim of RF EMF exposure regulations is to ensure that human exposure to RF energy is kept within prescribed limits, which typically have been set with wide safety margins.

Some newly developed base stations and other radio equipment are equipped with so-called advanced antenna systems (AAS). These antenna systems increase the capacity and/or coverage compared to traditionally used antenna systems by addition of one or more antenna arrays. In turn, this enables the simultaneous transmission of parallel data streams between a base station on the network side and a terminal device at the user-side by means of so-called multiple-input-multiple-output (MIMO) transmission.

For base stations and other radio equipment having AAS systems with a large number of antenna elements in order to achieve a high directivity, there may be a large maximum beamforming gain. A consequence of a large beamforming gain is typically that the radiated power is concentrated in directional beams, meaning that the Equivalent Isotropic Radiated Power (EIRP) rating of the base station, i.e. the equivalent power radiated from an antenna with unity antenna gain in all directions, is increased as compared to the situation without AAS systems.

The RF EMF exposure limitations are typically expressed in terms of the power density (in units of $W/m^2$) which in the far field is proportional to the EIRP. Consequently, the EIRP can be used to determine the power density in the far field.

The ICNIRP and other RF EMF exposure limitations are usually expressed in terms of average power densities over a specified averaging time interval T. This means that the momentary power density can be higher during a shorter time than T, however the time-averaged power density over any time period T must be below the specified limit. To maintain a certain RF EMF compliance boundary or exclusion zone, that is smaller than what is obtained using the maximum EIRP of the AAS equipped radio, the time-averaged total transmit power needs to be controlled to be less than an average power threshold that is computed based on the RF exposure limitations and the selected exclusion zone. In cases where more than one radio power source share the same AAS or where several AASs are co-sited and aligned directionally, the threshold may have to be computed based on the combined EIRP of the site.

Hence, there may be a need for efficient co-ordinated control of the average EIRP for multiple base stations and other radio equipment.

SUMMARY

An object of embodiments herein is to provide efficient control of radio power sources of base stations and other radio equipment, so that RF EMF exclusion zones are maintained by the controlled time-averaged powers of the base stations and radio equipment.

This objective is generally solved by mechanisms performed by a coordinating controller for average EIRP control of at least two radio signal paths.

According to a first aspect there is presented a method for average EIRP control of at least two radio signal paths. The method is performed by a coordinating controller of a site. The site comprises the at least two radio signal paths. The method comprises obtaining, from inner controllers of the radio signal paths, information of long-term time averaged incoming and outgoing traffic per radio signal path. The method comprises determining a time varying reference value of average transmission power per radio signal path based on equalizing terms determined from the information of long-term time averaged incoming and outgoing traffic, antenna gain information per radio signal path, and a condition on total average EIRP for the site. The method comprises performing individual average EIRP control per radio signal path by providing to each respective inner controller, the time varying reference value determined for the radio signal path controlled by that inner controller.

According to a second aspect there is presented a coordinating controller for average EIRP control of at least two radio signal paths of a site. The coordinating controller comprises processing circuitry. The processing circuitry is configured to cause the coordinating controller to obtain, from inner controllers of the radio signal paths, information of long-term time averaged incoming and outgoing traffic per radio signal path. The processing circuitry is configured to cause the coordinating controller to determine a time varying reference value of average transmission power per radio signal path based on equalizing terms determined from the information of long-term time averaged incoming and outgoing traffic, antenna gain information per radio signal path, and a condition on total average EIRP for the site. The processing circuitry is configured to cause the coordinating controller to perform individual average EIRP control per radio signal path by providing to each respective inner controller, the time varying reference value determined for the radio signal path controlled by that inner controller.

According to a third aspect there is presented a coordinating controller for average EIRP control of at least two radio signal paths of a site. The coordinating controller comprises an obtain module configured to obtain, from inner controllers of the radio signal paths, information of long-term time averaged incoming and outgoing traffic per radio signal path. The coordinating controller comprises a determine module configured to determine a time varying reference value of average transmission power per radio signal path based on equalizing terms determined from the information of long-term time averaged incoming and outgoing traffic, antenna gain information per radio signal path, and a condition on total average EIRP for the site. The coordinating controller comprises a control module configured to perform individual average EIRP control per radio signal path by providing to each respective inner controller, the time varying reference value determined for the radio signal path controlled by that inner controller.

According to a fourth aspect there is presented a computer program for average EIRP control of at least two radio signal paths. The computer program comprises computer program code which, when run on processing circuitry of a coordinating controller, causes the coordinating controller to perform a method according to the first aspect.

The objective is generally further solved by mechanisms performed by an inner controller for average EIRP control of a radio signal path.

According to a fifth aspect there is presented a method for average EIRP control of a radio signal path. The method is performed by an inner controller of the radio signal path. The method comprises providing information of long-term time averaged incoming and outgoing traffic for the radio signal path to a coordinating controller of a site. The site comprises the radio signal path and at least one further radio signal path. The method comprises obtaining a time varying reference value of average transmission power for the radio signal path from the coordinating controller, the time varying reference value is determined based on equalizing terms determined from information of long-term time averaged incoming and outgoing traffic for all the radio signal paths, antenna gain information per radio signal path, and a condition on total average EIRP for the site. The method comprises performing average EIRP control of the radio signal path according to the time varying reference value. The average EIRP of the radio signal path is controlled based on an inner control loop run by the inner controller.

According to a sixth aspect there is presented an inner controller for average EIRP control of a radio signal path of a site. The inner controller comprises processing circuitry. The processing circuitry is configured to cause the inner controller to provide information of long-term time averaged incoming and outgoing traffic for the radio signal path to a coordinating controller of a site. The site comprises the radio signal path and at least one further radio signal path. The processing circuitry is configured to cause the inner controller to obtain a time varying reference value of average transmission power for the radio signal path from the coordinating controller, the time varying reference value is determined based on equalizing terms determined from information of long-term time averaged incoming and outgoing traffic for all the radio signal paths, antenna gain information per radio signal path, and a condition on total average EIRP for the site. The processing circuitry is configured to cause the inner controller to perform average EIRP control of the radio signal path according to the time varying reference value. The average EIRP of the radio signal path is controlled based on an inner control loop run by the inner controller.

According to a seventh aspect there is presented an inner controller for average EIRP control of a radio signal path of a site. The inner controller comprises a provide module configured to provide information of long-term time averaged incoming and outgoing traffic for the radio signal path to a coordinating controller of a site. The site comprises the radio signal path and at least one further radio signal path. The inner controller comprises an obtain module configured to obtain a time varying reference value of average transmission power for the radio signal path from the coordinating controller, the time varying reference value is determined based on equalizing terms determined from information of long-term time averaged incoming and outgoing traffic for all the radio signal paths, antenna gain per radio signal path, and a condition on total average EIRP for the site. The inner controller comprises a control module configured to perform average EIRP control of the radio signal path according to the time varying reference value. The average EIRP of the radio signal path is controlled based on an inner control loop run by the inner controller.

According to an eighth aspect there is presented a computer program for average EIRP control of a radio signal path, the computer program comprising computer program code which, when run on processing circuitry of an inner controller, causes the inner controller to perform a method according to the fifth aspect.

According to a ninth aspect there is presented a computer program product comprising a computer program according to at least one of the fourth aspect and the eighth aspect and a computer readable storage medium on which the computer program is stored. The computer readable storage medium could be a non-transitory computer readable storage medium.

Advantageously, these methods, these coordinating controllers, these inner controllers, these computer programs, and this computer program product provide efficient control of radio power sources of base stations and other radio equipment Advantageously, these methods, these coordinating controllers, these inner controllers, these computer programs, and this computer program product enable the throughput to be enhanced with respect to the prior art for separately scheduled co-sited aggregated carriers, with one or multiple radios in a single radio access network node, whilst guaranteeing that the total time-averaged transmitted power or EIRP is maintained below a threshold determined to obtain an exclusion zone outside of which the RF EMF exposure is in compliance with applicable regulations.

Advantageously, these methods, these coordinating controllers, these inner controllers, these computer programs, and this computer program product enable the throughput to be enhanced for separately scheduled co-sited aggregated carriers, with one or multiple radios in an architecture with multiple radio access network nodes and/or radio access technologies, whilst guaranteeing that the total time-averaged transmitted power or EIRP is maintained below a threshold determined to obtain an exclusion zone outside of which the RF EMF exposure is in compliance with applicable regulations.

Advantageously, these methods, these coordinating controllers, these inner controllers, these computer programs, and this computer program product enable the throughput to be enhanced in radio access network nodes applying spectrum sharing between separately scheduled LTE and NR resources over a shared time/frequency resource grid whilst guaranteeing that the total time-averaged transmitted power or EIRP is maintained below a threshold determined to obtain an exclusion zone outside of which the RF EMF exposure is in compliance with applicable regulations.

Advantageously, these methods, these coordinating controllers, these inner controllers, these computer programs, and this computer program product enable the throughput to be enhanced when separately scheduled LTE and NR radio access network nodes are connected in a dual-connectivity configuration, as in non-stand alone NR whilst guaranteeing that the total time-averaged transmitted power or EIRP is maintained below a threshold determined to obtain an exclusion zone outside of which the RF EMF exposure is in compliance with applicable regulations.

Advantageously, these methods, these coordinating controllers, these inner controllers, these computer programs, and this computer program product enable the throughput to be enhanced when separately scheduled beams of one or more AASs overlap and the herein disclosed methods are used to co-regulate the average EIRP for selected beam directions between scheduled carriers, different radio access network nodes, and/or different RATs, whilst guaranteeing that the total time-averaged transmitted power or EIRP is maintained below a threshold determined to obtain an exclusion zone outside of which the RF EMF exposure is in compliance with applicable regulations.

Advantageously, these methods, these coordinating controllers, these inner controllers, these computer programs, and this computer program product replaces previously needed configuration of an average power threshold per sector-carrier.

Advantageously, these methods, these coordinating controllers, these inner controllers, these computer programs, and this computer program product enable average EIRP control is enabled for NB-IoT, CAT-M, and Spectrum Sharing services.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
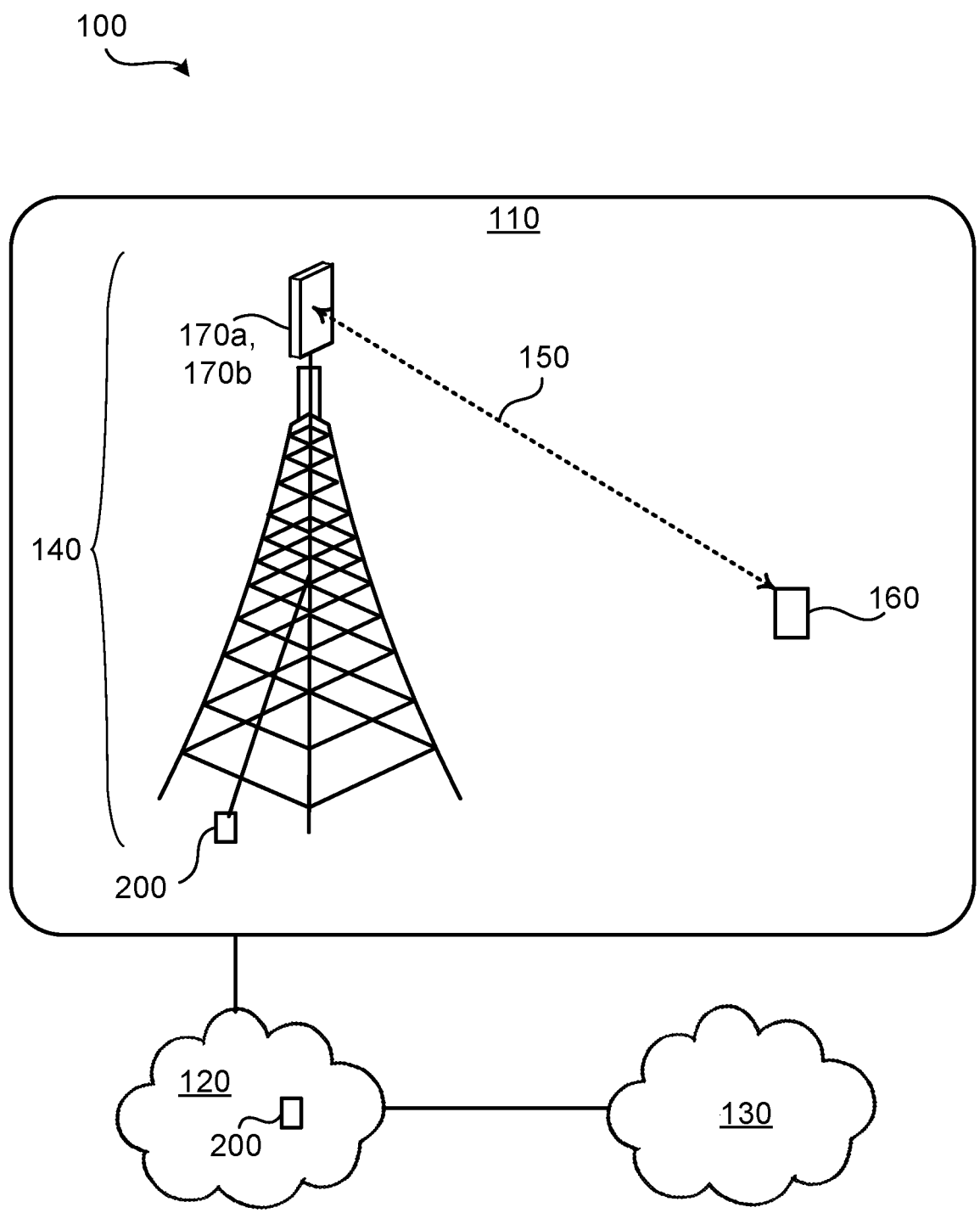
FIG. 1 is a schematic diagram illustrating a communication network according to embodiments.

FIG. 1 is a schematic diagram illustrating a communications network 100 where embodiments presented herein can be applied. The communications network 100 could be a third generation (3G) telecommunications network, a fourth generation (4G) telecommunications network, or a fifth (5G) telecommunications network, or any combination thereof, and support any 3GPP telecommunications standard, where applicable.

A site 140 provides network access to at least one terminal device 160 in a radio access network 110, thus enabling the terminal device 160 to communicate over a wireless link 150. The radio access network 110 is operatively connected to a core network 120. The core network 120 is in turn operatively connected to a service network 130, such as the Internet. The terminal device 160 is thereby enabled to, via the site 140, access services of, and exchange data with, the service network 130.

Examples of sites 140 are radio base stations, radio access network nodes, base transceiver stations, Node Bs (NBs), evolved Node Bs (eNBs), gNBs, access points, access nodes, integrated access and wireless backhaul nodes, and wireless backhaul nodes. Examples of terminal devices 160 are wireless devices, mobile stations, mobile phones, handsets, wireless local loop phones, user equipment (UE), smartphones, laptop computers, tablet computers, network equipped sensors, network equipped vehicles, and so-called Internet of Things devices.

The communications network 100 comprises a coordinating controller 200 configured to control how much power is transmitted along radio signal paths 170a, 170b of the site 140 for facilitating the communication to the terminal device 160. The coordinating controller 200 might comprise, be collocated with, integrated with, or be in operational communications with, the site 140. The site 140 might be configured for dual connectivity and/or carrier aggregation.

In some examples the site 140 is equipped with one, or multiple co-sited and bore sight aligned, AASs. Each AAS might then be configured to transmit radio power as provided from a respective at least one of the at least two radio signal paths 170a, 170b (i.e., from one or more respective ones of the radio signal paths 170a, 170b).

In some aspects the site 140 comprises one radio per radio signal path 170a, 170b, or per each subset of radio signal paths 170a, 17a, or per each radio access network node, whereas in other aspects the site 140 comprises one common radio for all radio signal paths 170a, 170b, or per all radio access network nodes. Hence, in some examples, signals from each carrier, or set of carriers, as transmitted by the site (140) are converted to radio frequency at one radio frequency converter module per radio signal path 170a, 170b before being fed to the AAS, whereas in other examples, signals from all carriers, or sets of carriers, as transmitted by the site 140 are combined at baseband and converted to radio frequency at a common radio frequency converter module before being fed to the AAS.

There might be different types of radio signals paths 170a, 170b and/or different types of entities that the radio signals paths 170*a*, 170*b* represent or are associated with. According to some examples, each radio signal path 170*a*, 170*b* is associated with a respective carrier, or set of carriers, as transmitted by the site 140. According to some examples, each radio signal path 170*a*, 170*b* is associated with a respective scheduler of the site 140. According to some examples, each radio signal path 170*a*, 170*b* represents a respective radio power source of a single radio access network node of the site 140. According to some examples, the site 140 comprises multiple radio access network nodes and each radio signal path 170*a*, 170*b* represents a respective radio access network node of the site 140.

In some aspects the site 140 supports spectrum sharing by means of transmission using at least two different radio access technologies (RATs), such as transmission over the 4G Long Term Evolution (LTE) air interface and the 5G New Radio (NR) air interface. Spectrum sharing allows LTE and NR to share a common time/frequency resource grid. Time/frequency resources in the time/frequency resource grid might be allocated separately for different RATs. Thus, according to some examples, at least one of the at least two radio signal paths 170*a*, 170*b* is configured for a first RAT, and at least one other of the at least two radio signal paths 170*a*, 170*b* is configured for a second RAT different from the first RAT. The herein disclosed embodiments then enable coordinated control of the average power or EIRP transmitted via radio signal paths 170*a*, 170*b* used for spectrum sharing. In some examples, the first RAT and the second RAT share a common time/frequency resource grid. In other examples, the first RAT and the second RAT each has its own time/frequency resource grid.

In some aspects the site 140 supports dual connectivity. In general terms, according to dual connectivity, a terminal device 160 might simultaneously receive and transmit to at least two different radio access network nodes, such as a (Master-) MeNB and a (Secondary-) SeNB. In the split bearer architecture option of dual connectivity in the downlink, data is split on the Packet Data Convergence Protocol (PDCP) layer in the MeNB. The radio access network node might route PDCP protocol data units (PDUs) dynamically via MeNB Radio Link Control (RLC) to the terminal device 160 directly, or via a backhaul channel to the SeNB and then via RLC of the SeNB to the terminal device 200.

In some aspects the site 140 supports carrier aggregation. In general terms, according to carrier aggregation a terminal device 160 might simultaneously receive and transmit on at least two different carriers while using a common PDCP, RLC and medium access control (MAC) layer for the carriers but a separate physical layer for each carrier. The site 140 selects the radio resources, modulation, coding and MIMO layers to use on each carrier and schedule MAC PDUs on the carriers based on this selection and on feedback from the terminal device 160. This is in general referred to as scheduling. The carriers are synchronized in time. This implies that a common controller, i.e., the coordinating controller 200, of the site 140 can coordinate and control the average power or EIRP transmitted via each carrier per transmission time interval (TTI). Each carrier is also associated with a cell as resource owner.

In some aspects the site 140 supports narrowband IoT (NB-IoT) services. NB-IoT is intended for service of IoT devices with very modest data rates. Support for NB-IoT services might even be implemented in the guard band of LTE. It can be thought of as using a single physical resource block (PRB) of the available time-frequency grid. Since the served wireless device 160 might need only very infrequent updates, the NB-IoT service might sleep during periods of time. Hence, the PRB might be shared with another service.

In some aspects the site 140 supports LTE CAT-M services. In general terms, as compared to NB-IoT, LTE CAT-M supports higher data rates by the use of 1.4 MHz of the Orthogonal Frequency Division Multiple Access (OFDMA) time/frequency resource grid. LTE CAT-M can be thought of as using multiple PRBs of the available time-frequency grid. Since the served wireless device 160 might need only very infrequent updates, the LTE CAT-M service might sleep during periods of time. Hence, the PRBs might be shared with another service.

The AAS might be configured for beamforming. In some examples the range of the AAS is described as the union of a set of discrete beam directions in azimuth and elevation, with respect to the bore sight direction of the AAS. In case of so-called codebook based beamforming, a set of configurable beams with specific directions are provided. These codebooks are very similar between LTE and NR. Therefore, in case the AAS is shared between an LTE node and an NR node, certain sets of beam direction codebook entries might produce overlapping beams. One inner controller 300*a*, 300*b* might then be applied to control the average power or EIRP per beam direction, thereby controlling multiple average powers or EIRPs in a certain direction in an improved way, as compared to application of multiple single individual controllers based on fixed average power or EIRP threshold budgets, per beam direction. The same principle can be applied also for reciprocity assisted transmission.

In some aspects the site 140 thus supports directional transmission. Then, according to some examples, at least one of the at least two radio signal paths 170*a*, 170*b* is configured for control of average power or EIRP of a first set of beam direction codebook entries, and at least one other of the at least two radio signal paths 170*a*, 170*b* is configured average power or EIRP control of a second set of beam direction codebook entries, at least partly overlapping with the first set of beam direction codebook entries. The herein disclosed embodiments then enable coordinated average power or EIRP control for radio signal paths 170*a*, 170*b* of a site 140 that supports overlapping beam sets.

As mentioned above there is a need for efficient control of the average EIRP for base stations and other radio equipment, in particular when the base stations and pieces of radio equipment are co-sited and directionally aligned.

For example, assume a scenario where multiple carriers in a single site 140, possibly using different RATs, are transmitting over the same geographical region, like a cell. For simplicity, antenna array sharing is assumed. Assume further that the site 140 has an inner controller 300*a*, 300*b* that implements functionality for single node average EIRP control. The inner control loop of each radio signal path 170*a*, 170*b* might be supervised by the inner controller 300*a*, 300*b* of each radio signal path 170*a*, 170*b* whereas the average EIRP control of the radio signal paths 170*a*, 170*b* is collectively controlled by the coordinating controller 200 by providing coordinating control information to the inner controllers 300*a*, 300*b*.

Whenever aspects of the inner controllers 300*a*, 300*b* are addressed, the concepts of "average power control" and "average EIRP control" may be used interchangeably; one of the two does not exclude that the other one may be equally valid.

The embodiments disclosed herein relate to mechanisms for average EIRP control of radio signal paths 170*a*, 170*b*. In order to obtain such mechanisms there is provided a coordinating controller 200, a method performed by the coordinating controller 200, a computer program product comprising code, for example in the form of a computer program, that when run on processing circuitry of the coordinating controller 200, causes the coordinating controller 200 to perform the method. In order to obtain such mechanisms there is further provided an inner controller 300a, 300b, a method performed by the inner controller 300a, 300b, and a computer program product comprising code, for example in the form of a computer program, that when run on processing circuitry of the inner controller 300a, 300b, causes the inner controller 300a, 300b to perform the method.

Figure 2:
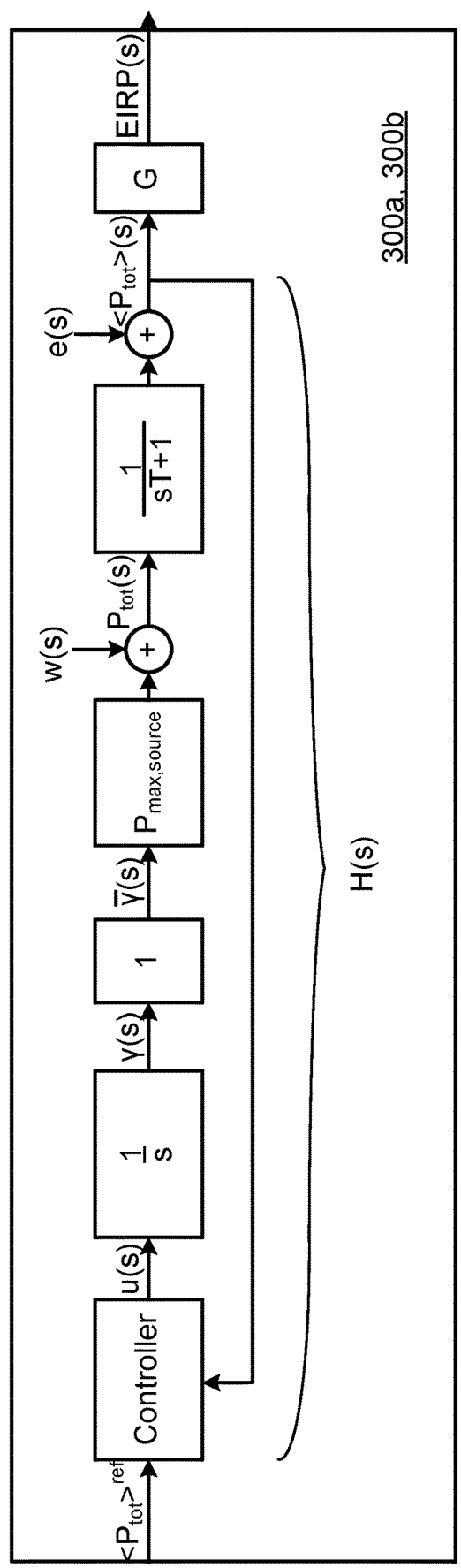
FIGS. 2, 5, 6 are block diagrams of controllers according to embodiments.

FIG. 2 is a block diagram of a controller 300a, 300b where feedback control has been enabled by a feedback control loop, in this disclosure denoted an average power control loop. In FIG. 2, $\langle P_{tot} \rangle^{ref}$ denotes the setpoint for the averaged power (typically slightly less than the computed threshold value for the averaged power), 1/s denotes the actuator dynamics with lower and upper limits inactive, $\bar{\gamma}(s)$ denotes the scheduler limitation after lower and upper limitation (inactive in FIG. 2), $P_{max,source}$ denotes the maximal momentary total power of one radio signal path, w(s) denotes a disturbance representing predicted power errors, 1/(sT+1) represents an autoregressive simplified model of the averaging, $\langle P_{tot} \rangle (s)$ denotes the averaged total power, e(s) denotes a measurement disturbance, G denotes the antenna gain and EIRP(s) denotes the EIRP. All quantities are in FIG. 2 expressed in the complex Laplace transform domain, which is allowed since the feedback control mechanism design is performed with constraints inactive.

In some aspects the controller block is given by:

$$u(s) = CT(1+T_D s)(\langle P_{tot} \rangle^{ref} - \langle P_{tot} \rangle (s)).$$

Here, u(s) is the control signal. A controller implementing this controller block is of proportional-derivative (PD) type. C denotes the proportional gain, and $T_D$ the differentiation time. To implement the feedback control mechanism, $\langle P_{tot} \rangle^{ref}$, $\langle P_{tot} \rangle (t)$ and $\langle P_{tot}^{\cdot} \rangle (t)$ are needed. The first two quantities can be obtained by configuration and averaging of measured spectral density's by C, while the second quantity needs to be estimated. This can e.g. be achieved by autoregressive filtering of $\langle P_{tot} \rangle (t)$ with the filter:

$$\langle P_{tot}^{\cdot} \rangle (s) = \frac{\alpha s}{s+\alpha} \langle P_{tot} \rangle (s),$$

where $\alpha$ is a filter parameter.

In order to further emphasize the back-off control performance it could be advisable to only allow differential control action that reduces the scheduler threshold $\gamma(t)$, meaning that only negative contributions from the second term of the feedback mechanism should be allowed. This means that in the time domain, the following restriction to the derivative $\langle P_{tot}^{\cdot} \rangle (t)$ might be applied:

$$u(t) = CT(\langle P_{tot} \rangle^{ref} - \langle P_{tot} \rangle (t)) - CTT_D \max(0, \langle P_{tot}^{\cdot} \rangle (t)).$$

It might occur that the feedback control mechanism is not fast enough to prevent a small overshoot of the threshold value. To prevent this from occurring, a hard back-off might be superimposed over the herein disclosed feedback control mechanism. In some aspects this hard back-off operates by setting the scheduler threshold $\gamma(t)$ to its minimum value $\gamma_{low}$ whenever the following holds:

$$\langle P_{tot} \rangle (t) > \text{margin} \cdot P_{threshold}$$

where margin is a value slightly below 1 and where $P_{threshold}$ is the maximum averaged power threshold determined to obtain an exclusion zone, outside of which compliance with a regulatory RF EMF exposure requirement follows. Further aspects of the scheduler threshold $\gamma(t)$ will be disclosed below.

In some aspects there is one control signal $u_i(s)$, i=1, . . . , n, for each of the n radio power sources and hence the index i can be appended to any relevant quantities, such as $\langle P_{tot,i} \rangle^{ref}$, $\langle P_{tot,i} \rangle (t)$ and $\langle P_{tot,i}^{\cdot} \rangle (t)$, etc.

It should be noted that in embodiments where the above inner controller 300a, 300b shown by FIG. 2 is modified to be used for certain beam directions, values given as powers may be replaced by values given as EIRPs in certain parts of the control loop.

Figure 3:
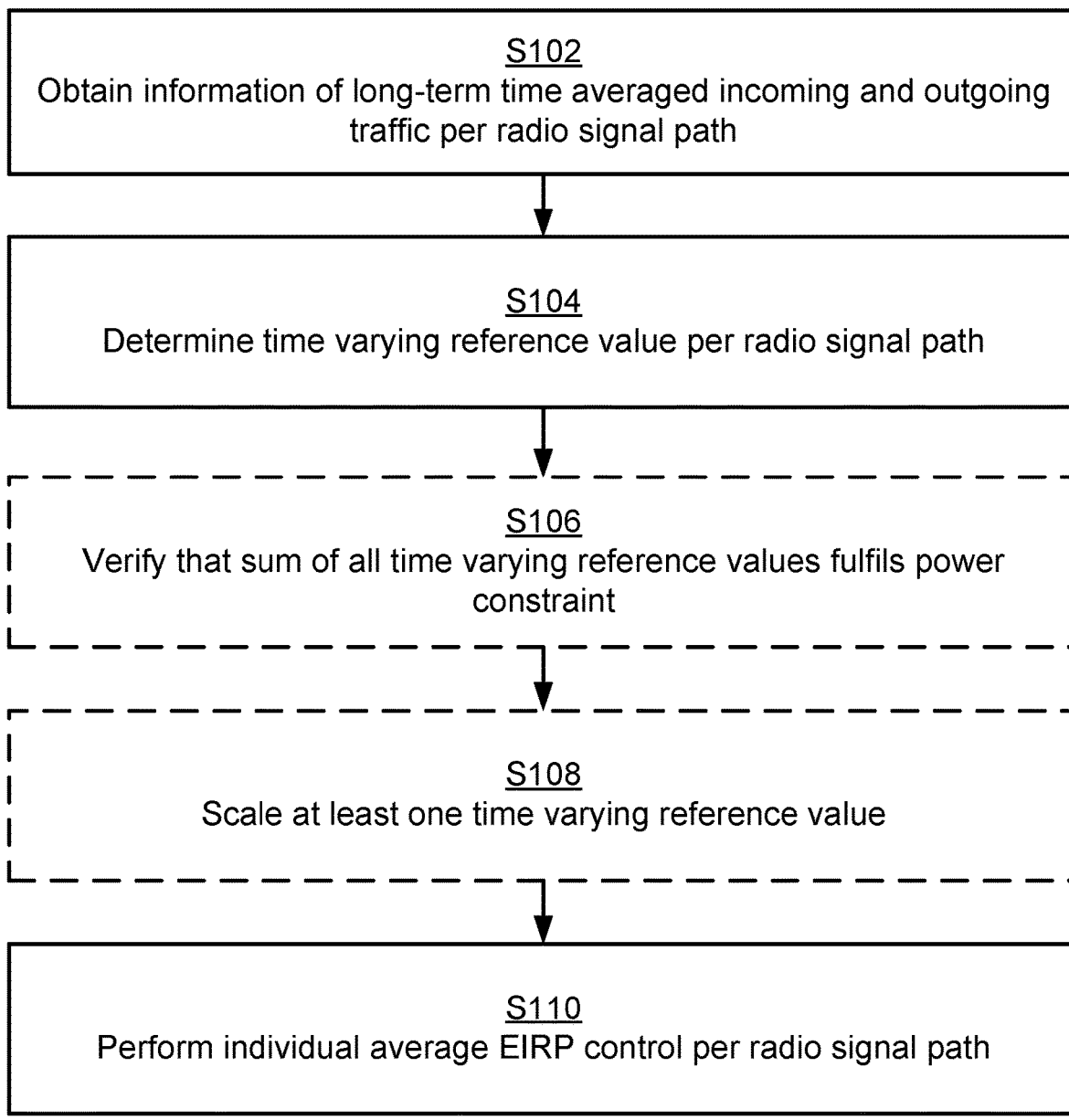
FIGS. 3 and 4 are flowcharts of methods according to embodiments.

Reference is now made to FIG. 3 illustrating a method according to an embodiment for average EIRP control of at least two radio signal paths 170a, 170b as performed by a coordinating controller 200 of a site 140. The site 140 comprises the at least two radio signal paths 170a, 170b.

The control of the at least two radio signal paths 170a, 170b as performed by the coordinating controller 200 is based on information as provided by the inner controllers 300a, 300b. Hence the coordinating controller 200 is configured to perform step S102:

S102: The coordinating controller 200 obtains, from inner controllers 300a, 300b of the radio signal paths 170a, 170b, information of long-term time averaged incoming and outgoing traffic $\langle \langle r_{in} \rangle \rangle_i$, $\langle \langle r_{out} \rangle \rangle_i$ per radio signal path 170a, 170b.

In other words, for a given radio signal path, the coordinating controller 200 obtains the information of long-term time averaged incoming and outgoing traffic $\langle \langle r_{in} \rangle \rangle_i$, $\langle \langle r_{out} \rangle \rangle_i$ of that given radio signal path only from the inner controller of that given radio signal path.

Control of the at least two radio signal paths 170a, 170b is then determined. Particularly, the coordinating controller 200 is configured to perform step S104:

S104: The coordinating controller 200 determines a time varying reference value $\langle P_{tot} \rangle_i^{ref}(t)$ of average transmission power per radio signal path 170a, 170b. The time varying reference value $\langle P_{tot} \rangle_i^{ref}(t)$ is determined based on equalizing terms determined from the information of long-term time averaged incoming and outgoing traffic, antenna gain information $G_i(t)$ per radio signal path 170a, 170b, and a condition on total average EIRP for the site 140.

Individual average EIRP control of each of the at least two radio signal paths 170a, 170b is then performed. Particularly, the coordinating controller 200 is configured to perform step S110:

S110: The coordinating controller 200 performs individual average EIRP control per radio signal path 170a, 170b by providing to each respective inner controller 300a, 300b, the time varying reference value $\langle P_{tot} \rangle_i^{ref}(t)$ determined for the radio signal path 170a, 170b controlled by that inner controller 300a, 300b.

Embodiments relating to further details of average EIRP control of at least two radio signal paths 170a, 170b as performed by the coordinating controller 200 will now be disclosed.

In some examples, the time varying reference value is determined for a shorter time interval than for which the information of long-term time averaged incoming and outgoing traffic is valid.

There could be different types of information of long-term time averaged incoming and outgoing traffic per radio signal path 170a, 170b. In some examples, the information of long-term time averaged incoming traffic per radio signal path 170a, 170b pertains to number of packets per second or number of bits per second being received per radio signal path 170a, 170b. Likewise, in some examples, the information of long-term time averaged outgoing traffic per radio signal path 170a, 170b pertains to number of packets per second or number of bits per second being transmitted per radio signal path 170a, 170b.

Aspects of EIRP control constraint to maintain exclusion zone compliance, to meet RF exposure regulations will now be disclosed.

In the following it is assumed that there are n radio signal paths that need joint average EIRP control.

It is first noted that the RF EMF exposure is directly related to the EIRP in the far-field. By averaging over a time window T, stated by regulations, it follows that the sum of the so obtained time averaged EIRP contributions from each radio signal paths should obey:

$$\frac{1}{T}\int_{t-T}^{t}\sum_{i=1}^{n}P_i(\tau)G_i(\tau)d\tau = \sum_{i=1}^{n}\int_{t-T}^{t}P_i(\tau)G_i(\tau)d\tau \leq P_{EIRP,threshold}.$$

Here $P_{EIRP,threshold}$ is the total averaged EIRP threshold determined to obtain an exclusion zone, outside of which compliance with a regulatory RF EMF exposure requirement follows. A further simplification can be achieved in case the momentary antenna gain is reduced to the maximum antenna gain, $G_i$, of each contributing source, an approximation that amounts to handling a cell wide average power control loop. In such situations the above equation reduces to averaging of powers alone as:

$$\sum_{i=1}^{n}G_i\left(\frac{1}{T}\int_{t-T}^{t}P_i(\tau)d\tau\right) = \sum_{i=1}^{n}G_i\langle P_i\rangle(t) \leq P_{EIRP,threshold}.$$

Although covering a special case, this latter equation will be at the focal point in the coordinating average EIRP controller 200 since it lends itself to simple linear MIMO control.

In order to benefit from time averaging over the time window T, an EIRP constraint can now be introduced for the above sum, where it is assumed that e.g. deployment constraints lead to the constraint:

$$\sum_{i=1}^{n}G_i\langle P_i\rangle(t) \leq \langle P\rangle_{EIRP,threshold} = \mu P_{EIRP,max}.$$

Here, $\mu$ is a factor that is computed from the determined power threshold, and obtained by using the average EIRP constraint $\langle P\rangle_{EIRP,threshold}$ as compared to the momentary constraining EIRP $P_{EIRP,max}$. Therefore, in some embodiments, the equalizing terms further are determined from the factor $\mu$ for the site 140. The reference value of the inner controllers 300a, 300b for each average power controlled entity can then be used to define the following average EIRP control objective:

$$\sum_{i=1}^{n}G_i\langle P_{tot}\rangle_i^{ref}(t) = \varepsilon\mu P_{EIRP,max}.$$

Here $\varepsilon$ is a control headroom factor with a value slightly less than 1 needed to achieve control headroom. Therefore, in some embodiments, the equalizing terms further are determined from a control headroom factor $\varepsilon$ for the site 140. The condition on total average EIRP for the site 140 is in some embodiments thus given in terms of the control headroom factor $\varepsilon$, the factor $\mu$, and a requirement $P_{EIRP,max}$ on momentary EIRP for the site 140.

Aspects of throughput maximizing MIMO average EIRP control will now be disclosed.

In some aspects, the equalizing terms are computed with the control objective to minimize throughput loss. That is, in some embodiments, the equalizing terms are determined according to a control objective to minimize overall throughput loss of the site 140. Further aspects relating thereto will now be disclosed.

In general terms, a throughput maximization is the same as a minimization of a metric expressing the difference between the incoming traffic data rate, given by $\langle\langle r_{in}\rangle\rangle_i$, and the outgoing traffic data rate, given by $\langle\langle r_{out}\rangle\rangle_i$. A formulation of an optimization problem could therefore be based on the metric:

$$\Phi = \sum_{i=1}^{n}\beta_i\|\langle\langle r_{in}\rangle\rangle_i - \langle\langle r_{out}\rangle\rangle_i\|^2$$

where $\langle\langle r_{in}\rangle\rangle_i$ and $\langle\langle r_{out}\rangle\rangle_i$ is the incoming and outgoing (long term) average traffic for radio signal path i, where $\|\cdot\|$ denotes a norm, where $\beta_i$ is a weight for radio signal path i, and where $\Phi$ quantifies the total throughput reduction of the radio transmitters that are treated as co-sited. Hence, in some embodiments, the equalizing terms further are determined from constant weights $\beta_i$ per radio path. The incoming long term traffic may need to be derived by registering the amount of long term traffic that could not be freely scheduled, and adding this amount of long term traffic to the actual incoming long term traffic. This follows since traffic is not really lost, but rather the traffic blocking introduced by the inner loop controllers 300a, 300b tend to increase queuing that, when fed back to the data source, leads to a reduction of incoming traffic. Such solutions may be assumed in the subsequent disclosure.

The throughput reduction is, given that the single loop average power controllers are to be re-used, a function of the reference values set for these loops, i.e. of $\langle P_{tot}\rangle_i^{ref}$, i=1, . . . , n. To be able to compute a solution to the above optimization problem a model hence needs to be found that relates $\langle\langle r_{out}\rangle\rangle_i$ to $\langle P_{tot}\rangle_i^{ref}$. Using a Taylor series expansion it can be shown that:

$$\langle\langle r_{out}\rangle\rangle_i(\langle P_{tot}\rangle_i^{ref}) \approx \langle\langle r_{out}\rangle\rangle_i(\langle P_{tot}\rangle_{i,0}^{ref}) + \frac{\partial\langle\langle r_{out}\rangle\rangle_i}{\partial\langle P_{tot}\rangle_i^{ref}}(\langle P_{tot}\rangle_i^{ref} - \langle P_{tot}\rangle_{i,0}^{ref}).$$

Here the bias term and the partial derivative term are not yet determined, whilst the reference value at the nominal operating point, indexed by 0, may be configured as for single loop average power controllers 300a, 300b. The bias term can be estimated by averaging the output traffic of each inner loop average power controller 300a, 300b when running. This yields:

$$\langle\langle r_{out}\rangle\rangle_i (\langle P_{tot}\rangle_{i,0}^{ref}) = \langle\langle r_{out}\rangle\rangle_{i,0}.$$

It then remains to derive an expression for the partial derivative term. If the reference value would be equal to the maximum power of the radio signal path, then:

$$\langle\langle r_{out}\rangle\rangle_i = \langle\langle r_{in}\rangle\rangle_i.$$

Similarly, if the reference value would be equal to zero, then:

$$\langle\langle r_{out}\rangle\rangle_i = 0.$$

It therefore follows that an estimate of the partial derivative term may be obtained by a secant approximation as:

$$\frac{\partial \langle\langle r_{out}\rangle\rangle_i}{\partial \langle P_{tot}\rangle_i^{ref}} \approx \frac{\langle\langle r_{in}\rangle\rangle_i}{P_{max,tx,i}}.$$

To obtain some tuning flexibility for the derivative approximation, scale factors $\xi_i$ might be introduced. Therefore, in some embodiments, the equalizing terms further are determined from scale factors $\xi_i$ per radio path. This yields:

$$\langle\langle r_{out}\rangle\rangle_i (\langle P_{tot}\rangle_i^{ref}) \approx \langle\langle r_{out}\rangle\rangle_{i,0} + \xi_i \frac{\langle\langle r_{in}\rangle\rangle_i}{P_{max,tx,i}} (\langle P_{tot}\rangle_i^{ref} - \langle P_{tot}\rangle_{i,0}^{ref}).$$

Here, $\langle\langle r_{out}\rangle\rangle_{k,0}$ can be continuously estimated by means of averaging when starting the average EIRP control. A new value can then be selected at regular time intervals, or continuously. The nominal reference values $\langle P_{tot}\rangle_{i,0}^{ref}$ could either be selected from prior knowledge, or estimated by averaging. The performance metric (or criterion) then becomes:

$$\Phi = \sum_{i=1}^n \beta_i \left\| \langle\langle r_{in}\rangle\rangle_i - \langle\langle r_{out}\rangle\rangle_{i,0} - \frac{\langle\langle r_{in}\rangle\rangle_i}{P_{max,tx,i}/\xi_i}(\langle P_{tot}\rangle_i^{ref} - \langle P_{tot}\rangle_{i,0}^{ref}) \right\|^2 =$$

$$\sum_{i=1}^n \beta_i \left( \langle\langle r_{in}\rangle\rangle_i - \langle\langle r_{out}\rangle\rangle_{i,0} - \frac{\langle\langle r_{in}\rangle\rangle_i}{P_{max,tx,i}/\xi_i}(\langle P_{tot}\rangle_i^{ref} - \langle P_{tot}\rangle_{i,0}^{ref}) \right)^2.$$

Since the average EIRP constraint is to be fulfilled at all times, the optimization problem can be formulated as:

$$\min_{\langle P_{tot}\rangle_k^{ref}(t),k=1,\ldots,n} \Phi =$$

$$\min_{\langle P_{tot}\rangle_k^{ref}(t),k=1,\ldots,n} \sum_{i=1}^n \beta_i \langle\langle r_{in}\rangle\rangle_i^2 \left( 1 - \frac{\langle\langle r_{out}\rangle\rangle_{i,0}}{\langle\langle r_{in}\rangle\rangle_i} - \frac{(\langle P_{tot}\rangle_i^{ref} - \langle P_{tot}\rangle_{i,0}^{ref})}{P_{max,tx,i}/\xi_i} \right)^2$$

subject to:

$$\sum_{i=1}^n G_i \langle P_{tot}\rangle_i^{ref}(t) = \varepsilon\mu P_{EIRP,max}.$$

To solve the optimization problem, Lagrange multipliers can be applied, by using the following Lagrangian for minimization:

$$L = \Phi + \lambda(G^T \langle P_{tot}\rangle^{ref} - \varepsilon\mu P_{EIRP,max}).$$

The partial derivative terms then become:

$$\frac{\partial L}{\partial \langle P_{tot}\rangle_k^{ref}} =$$

$$-2\beta_k \langle\langle r_{in}\rangle\rangle_k^2 \left( 1 - \frac{\langle\langle r_{out}\rangle\rangle_{k,0}}{\langle\langle r_{in}\rangle\rangle_k} - \frac{(\langle P_{tot}\rangle_k^{ref} - \langle P_{tot}\rangle_{k,0}^{ref})}{P_{max,tx,k}/\xi_k} \right) \frac{1}{P_{max,tx,k}/\xi_k} + \lambda G_k,$$

$$k = 1, \ldots, n$$

$$\frac{\partial L}{\partial \lambda} = G^T \langle P_{tot}\rangle^{ref} - \varepsilon\mu P_{EIRP,max}.$$

Equating the partial derivative terms to 0 gives the necessary conditions for an optimum. Using the first equation to solve for $\lambda$, results in:

$$\lambda = -\frac{2\beta_1 \langle\langle r_{in}\rangle\rangle_1^2}{P_{max,tx,k}/\xi_1 G_1} \left( 1 - \frac{\langle\langle r_{out}\rangle\rangle_{1,0}}{\langle\langle r_{in}\rangle\rangle_1} - \frac{(\langle P_{tot}\rangle_1^{ref} - \langle P_{tot}\rangle_{1,0}^{ref})}{P_{max,tx,1}/\xi_1} \right).$$

Inserting the result in the remaining necessary conditions results in the equations:

$$\frac{\beta_1 \langle\langle r_{in}\rangle\rangle_k^2}{P_{max,tx,k}/\xi_k G_k} \left( 1 - \frac{\langle\langle r_{out}\rangle\rangle_{k,0}}{\langle\langle r_{in}\rangle\rangle_k} - \frac{(\langle P_{tot}\rangle_1^{ref} - \langle P_{tot}\rangle_{1,0}^{ref})}{P_{max,tx,1}/\xi_1} \right) =$$

$$\frac{\beta_1 \langle\langle r_{in}\rangle\rangle_1^2}{P_{max,tx,k}/\xi_1 G_1} \left( 1 - \frac{\langle\langle r_{out}\rangle\rangle_{1,0}}{\langle\langle r_{in}\rangle\rangle_1} - \frac{(\langle P_{tot}\rangle_1^{ref} - \langle P_{tot}\rangle_{1,0}^{ref})}{P_{max,tx,1}/\xi_k} \right),$$

and $$G^T \langle P_{tot}\rangle^{ref} = \varepsilon\mu P_{EIRP,max}.$$

The first equation can be solved for $\langle P_{tot}\rangle_k^{ref}$, giving:

$$\langle P_{tot}\rangle_k^{ref} = \langle P_{tot}\rangle_{k,0}^{ref} + P_{max,tx,k}/\xi_k \left( 1 - \frac{\langle\langle r_{out}\rangle\rangle_{k,0}}{\langle\langle r_{in}\rangle\rangle_k} - \right.$$

$$\frac{\beta_1 \langle\langle r_{in}\rangle\rangle_1^2 G_k P_{max,tx,k}/\xi_k}{\beta_k \langle\langle r_{in}\rangle\rangle_k^2 G_1 P_{max,tx,1}/\xi_1} \left( 1 - \frac{\langle\langle r_{out}\rangle\rangle_{1,0}}{\langle\langle r_{in}\rangle\rangle_1} - \frac{(\langle P_{tot}\rangle_1^{ref} - \langle P_{tot}\rangle_{1,0}^{ref})}{P_{max,tx,1}/\xi_1} \right) =$$

$$\langle P_{tot}\rangle_{k,0}^{ref} + P_{max,tx,k}/\xi_k \left( 1 - \frac{\langle\langle r_{out}\rangle\rangle_{k,0}}{\langle\langle r_{in}\rangle\rangle_k} \right) - P_{max,tx,k}/\xi_k \frac{\frac{\beta_1 \langle\langle r_{in}\rangle\rangle_1^2 G_k P_{max,tx,k}/\xi_k}{\beta_k \langle\langle r_{in}\rangle\rangle_k^2 G_1 P_{max,tx,1}}}{\xi_1}$$

$$\left( 1 - \frac{\langle\langle r_{out}\rangle\rangle_{1,0}}{\langle\langle r_{in}\rangle\rangle_1} \right) - P_{max,tx,k}/\xi_k \frac{\frac{\beta_1 \langle\langle r_{in}\rangle\rangle_1^2 G_k P_{max,tx,k}/\xi_k}{\beta_k \langle\langle r_{in}\rangle\rangle_k^2 G_1 P_{max,tx,1}}}{\xi_1} \frac{1}{P_{max,tx,1}/k_1} \langle P_{tot}\rangle_{1,0}^{ref} +$$

$$P_{max,tx,k}/\xi_k \frac{\frac{\beta_1 \langle\langle r_{in}\rangle\rangle_1^2 G_k P_{max,tx,k}}{\xi_k}}{\frac{\beta_k \langle\langle r_{in}\rangle\rangle_k^2 G_k P_{max,tx,1}}{\xi_1}} \frac{1}{P_{max,tx,1}/k_1} \langle P_{tot}\rangle_1^{ref} =$$

$$\langle P_{tot}\rangle_{k,0}^{ref} + \frac{P_{max,tx,k}}{\xi_k}\left( 1 - \frac{\langle\langle r_{out}\rangle\rangle_{k,0}}{\langle\langle r_{in}\rangle\rangle_k} \right) -$$

$$\frac{\beta_1 \langle\langle r_{in}\rangle\rangle_1^2 \xi_1 G_k P_{max,tx,k}}{\beta_k \langle\langle r_{in}\rangle\rangle_k^2 \xi_k^2 G_1 P_{max,tx,1}}\left( 1 - \frac{\langle\langle r_{out}\rangle\rangle_{1,0}}{\langle\langle r_{in}\rangle\rangle_1} \right) - \frac{\beta_1 \langle\langle r_{in}\rangle\rangle_1^2 \xi_1^2 G_k P_{max,tx,k}^2}{\beta_k \langle\langle r_{in}\rangle\rangle_k^2 \xi_k^2 G_1 P_{max,tx,1}^2} \langle P_{tot}\rangle_{1,0}^{ref} +$$

$$\frac{\beta_1 \langle\langle r_{in}\rangle\rangle_1^2 \xi_1^2 G_k P_{max,tx,k}^2}{\beta_k \langle\langle r_{in}\rangle\rangle_k^2 \xi_k^2 G_1 P_{max,tx,1}^2} \langle P_{tot}\rangle_1^{ref} \equiv a_k + b_k \langle P_{tot}\rangle_1^{ref}.$$

This equation can be vectorized as:

$$\langle P_{tot}\rangle^{ref} = a + b\langle P_{tot}\rangle_1^{ref},$$

where:

$$\langle P_{tot}\rangle^{ref} = \begin{pmatrix} \langle P_{tot}\rangle_1^{ref} \\ \vdots \\ \langle P_{tot}\rangle_n^{ref} \end{pmatrix}$$

$$a = \begin{pmatrix} 0 \\ a_2 \\ \vdots \\ a_n \end{pmatrix}$$

$$b = \begin{pmatrix} 1 \\ b_2 \\ \vdots \\ b_n \end{pmatrix}$$

$$a_k = \langle P_{tot}\rangle_{k,0}^{ref} + \frac{P_{max,tx,k}}{\xi_k}\left(1 - \frac{\langle\langle r_{out}\rangle\rangle_{k,0}}{\langle\langle r_{in}\rangle\rangle_k}\right) - \frac{\beta_1\langle\langle r_{in}\rangle\rangle_1^2\xi_1^2 G_k P_{max,tx,k}}{\beta_k\langle\langle r_{in}\rangle\rangle_k^2\xi_k^2 G_1 P_{max,tx,1}}\left(1 - \frac{\langle\langle r_{out}\rangle\rangle_{1,0}}{\langle\langle r_{in}\rangle\rangle_1}\right) - \frac{\beta_1\langle\langle r_{in}\rangle\rangle_1^2\xi_1^2 G_k P_{max,tx,k}}{\beta_k\langle\langle r_{in}\rangle\rangle_k^2\xi_k^2 G_1 P_{max,tx,1}}\langle P_{tot}\rangle_{1,0}^{ref},$$

$$k = 2, \ldots, n$$

$$b_k = \frac{\beta_1\langle\langle r_{in}\rangle\rangle_1^2\xi_1^2 G_k P_{max,tx,k}}{\beta_k\langle\langle r_{in}\rangle\rangle_k^2\xi_k^3 G_1 P_{max,tx,1}},$$

$$k = 2, \ldots, n.$$

Inserting this result in the regulatory equation for EIRP (i.e., $G^T\langle P_{tot}\rangle^{ref} = \varepsilon\mu P_{EIRP,max}$), results in:

$$G^T(a+b\langle P_{tot}\rangle_1^{ref}) = \varepsilon\mu P_{EIRP,max}.$$

This gives the final result:

$$\langle P_{tot}\rangle_1^{ref} = \frac{\varepsilon\mu P_{EIRP,max} - G^T a}{G^T b},$$

$$\langle P_{tot}\rangle^{ref} = a + b\langle P_{tot}\rangle_1^{ref}.$$

Aspects of slaving thresholds and limitations to the computed inner loop reference values will now be disclosed.

When inner loop reference values and other threshold values are released to improve the overall performance in co-siting situations, the applied linear control as applied by the coordinating controller 200 might in some cases not guarantee that the released variables stay within a suitable range. It might e.g. be required that the reference values $\langle P_{tot}\rangle_i^{ref}(t)$ are bounded to be within intervals defined by minimum values $\langle P_{min}\rangle_i$ and maximum values $\langle P_{max}\rangle_i$. That is:

$$\langle P_{min}\rangle_i \leq \langle P_{tot}\rangle_i^{ref}(t) \leq \langle P_{max}\rangle_i.$$

How to ensure that these inequalities are satisfied will be disclosed in more detailed next.

Thresholds that directly relate to the corresponding momentary EIRP limit are slaved to the corresponding reference values, since the coordinating controller 200 naturally affects the reference values of the inner control loops as performed by the inner controllers 300a, 300b.

The corresponding EIRP threshold fractions are slaved to the reference values since the coordinating controller 200 naturally interfaces via the reference values of the inner controllers 300a, 300b. However, special concern might be needed in order to secure that the average EIRP constraint is met when one or more of the reference values are at their limits. Hence, in some aspects it is verified that the sum of the reference values fulfils an average EIRP constraint. In particular, in some embodiments, the coordinating controller 200 is configured to perform (optional) step S106:

S106: The coordinating controller 200 verifies that a sum of all the determined time varying reference values of transmission power per all radio signal paths 170a, 170b of the site 140 fulfils an average EIRP constraint.

In some aspects, if the regulatory constraint is not fulfilled, then at least one of the reference values is scaled. In particular, in some embodiments, the coordinating controller 200 is configured to perform (optional) step S108:

S108: The coordinating controller 200 scales, when the sum fails to fulfil the average EIRP constraint, at least one of the determined time varying reference values with a scaling parameter $C_m$.

Step S108 might thus be performed when the verification in step S106 fails.

Aspects of how the scaling parameter $C_m$ might be determined will be disclosed below.

Below will be disclosed procedures that assume that the time varying reference value of transmission power with index m is constrained.

Firstly assume that the equation for the average EIRP constraint can be written as:

$$\sum_{m\neq i=1}^n G_i\langle P_{tot}\rangle_i^{ref} + G_m\langle P_{tot}\rangle_m^{ref} = \varepsilon\mu P_{EIRP,max}.$$

This gives:

$$\sum_{m\neq i=1}^n G_i\langle P_{tot}\rangle_i^{ref} = \varepsilon\mu P_{EIRP,max} - G_m\langle P_{tot}\rangle_m^{ref}.$$

secondly assume that the optimization above has been solved resulting in a solution defined by:

$$\{\langle P_{tot}\rangle_i^{ref,*}\}_{i=1}^n.$$

Then, if the math reference value is replaced with $\langle P_{limited}\rangle_m$, where $\langle P_{limited}\rangle_m$ is either equal to $\langle P_{min}\rangle_m$ or $\langle P_{max}\rangle_m$, the equation for the average EIRP constraint does no longer hold. To make it hold the above introduced scaling parameter $C_m$ can be applied to the remaining optimal reference values, such that:

$$C_m \sum_{m\neq i=1}^n G_i\langle P_{tot}\rangle_i^{ref,*} = \varepsilon\mu P_{EIRP,max} - G_m\langle P_{limited}\rangle_m^{ref}.$$

The scaling parameter $C_m$ thus can be determined according to:

$$C_m = \frac{\varepsilon\mu P_{EIRP,max} - G_m\langle P_{limited}\rangle_m}{\sum_{m\neq i=1}^n G_i\langle P_{tot}\rangle_i^{ref,*}}.$$

Hence, in some embodiments, the scaling parameter for time varying reference values of transmission power per radio signal path m is based on the determined time varying reference values of transmission power per all other radio signal paths i≠m of the site 140, and the total average EIRP for the site 140.

The reference values might then be modified as follows before being provided to the inner controllers 300a, 300b in step S110:

$$\{\langle P_{tot}\rangle_i^{ref,**}\}_{i=1}^n = \{\langle P_{limited}\rangle_m, \{C_m \langle P_{tot}\rangle_i^{ref,*}\}_{m\neq i=1}^n\}.$$

It might then be checked again if any further reference values need to be limited. If so, the scaling procedure is applied for these reference values. Hence, according to an embodiment, the at least one of the determined time varying reference values is repeatedly scaled, with an updated scaling parameter per each time the at least one of the determined time varying reference values is scaled, until the sum fulfils the average EIRP constraint. This scaling procedure can thus be repeated until no more limited reference values appear or until all reference values are limited.

A variation of the above scaling procedure is to start with the average EIRP constraint equation:

$$\sum_{m \neq i=1}^n G_i \langle P_{tot}\rangle_i^{ref} = \varepsilon \mu P_{EIRP,max} - G_m \langle P_{tot}\rangle_m^{ref}.$$

A new optimization step is then performed on the unlimited reference values. This scaling procedure is then repeated until no more limited reference values appear or until all reference values are limited.

Figure 4:
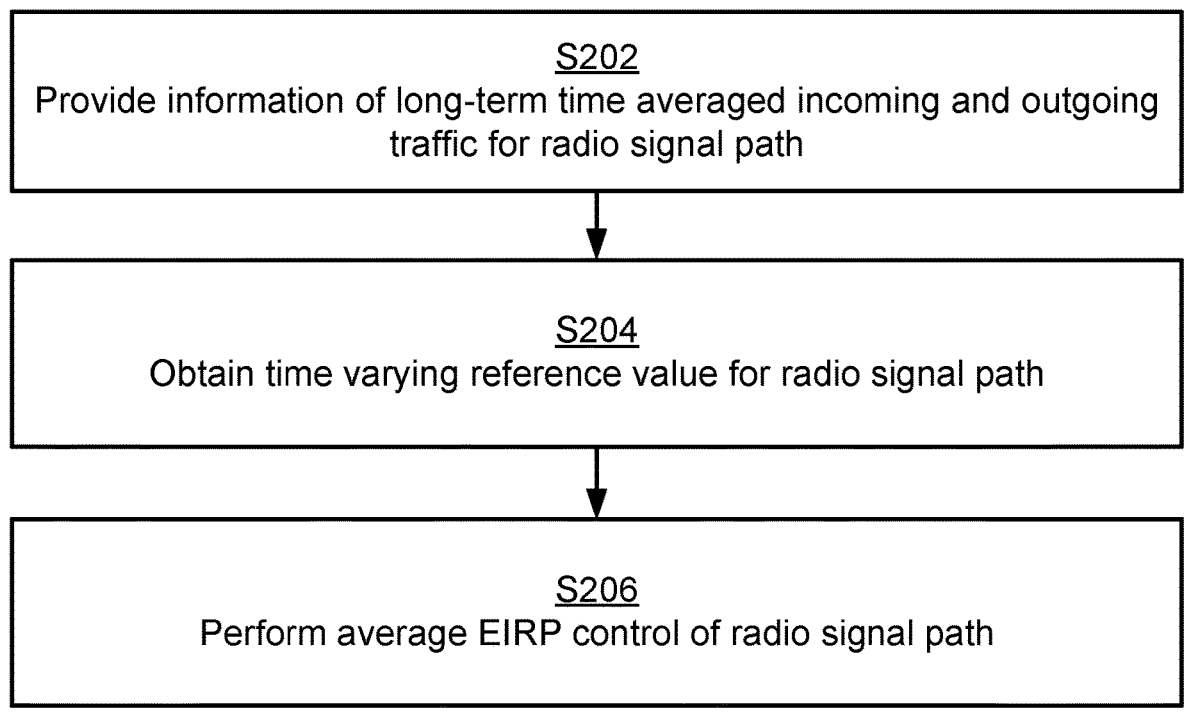

Reference is now made to FIG. 4 illustrating a method according to an embodiment for average EIRP control of a radio signal path 170a, 170b as performed by the inner controller 300a, 300b of the radio signal path 170a, 170b.

As disclosed above, the control of the radio signal path 170a, 170b as performed by the coordinating controller 200 is based on information provided by the inner controllers 300a, 300b. Hence the inner controller 300 is configured to perform step S202:

S202: The inner controller 300a, 300b provides information of long-term time averaged incoming and outgoing traffic $\langle\langle r_{in}\rangle\rangle_i$, $\langle\langle r_{out}\rangle\rangle_i$ for the radio signal path 170a, 170b to a coordinating controller 200 of a site 140, the site 140 comprising the radio signal path 170a, 170b and at least one further radio signal path 170a, 170b.

As further disclosed above, control of the radio signal path 170a, 170b is determined by the coordinating controller 300 and coordinating control information thereof is provided to the inner controllers 300a, 300b. Hence the inner controller 300a, 300b is configured to perform step S204:

S204: The inner controller 300a, 300b obtains a time varying reference value $\langle P_{tot}\rangle_i^{ref}(t)$ of average transmission power for the radio signal path 170a, 170b from the coordinating controller 200. The time varying reference value $\langle P_{tot}\rangle_i^{ref}(t)$ is determined based on equalizing terms determined from information of long-term time averaged incoming and outgoing traffic for all the radio signal paths 170a, 170b, antenna gain information $G_i(t)$ per radio signal path 170a, 170b, and a condition on total average EIRP for the site 140.

Average EIRP control of the radio signal path 170a, 170b is then performed. In particular, the inner controller 300a, 300b is configured to perform step S206:

S206: The inner controller 300a, 300b performs average EIRP control of the radio signal path 170a, 170b according to the time varying reference value $\langle P_{tot}\rangle_i^{ref}(t)$. The average EIRP of the radio signal path 170a, 170b is controlled based on an inner control loop run by the inner controller 300a, 300b.

Embodiments relating to further details of average EIRP control of a radio signal path 170a, 170b as performed by the inner controller 300a, 300b will now be disclosed.

In general terms, the embodiments, aspects, and examples as disclosed above with reference to the coordinating controller 200 applies also to each of the inner controllers 300a, 300b and a repeated disclosure thereof is therefore omitted.

Figure 5:
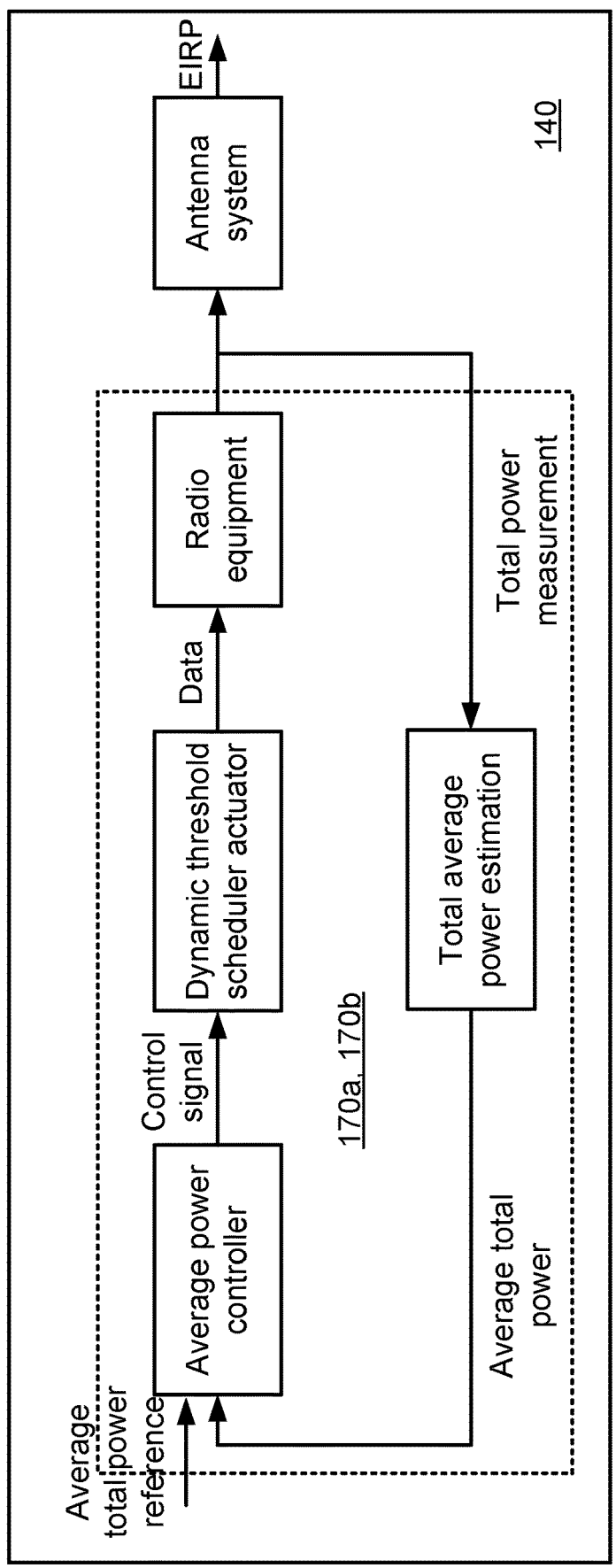

There may be different ways to obtain the values of total transmission power $P_{tot}(t)$. In some aspect the values of total transmission power $P_{tot}(t)$ are measured. FIG. 5 illustrates an architecture of the site 140 where a measured averaged total power feedback from the antenna system of the site 140 is used. According to FIG. 5 an average power controller, a dynamic threshold scheduler actuator, a total average transmission power estimator, and radio equipment are provided along a radio signal path. The components along the radio signal path are operatively connected to an antenna system (such as an AAS) that may be shared with other radio signal paths. The radio equipment and the antenna system are separated from the remaining components over an interface, such as the C2 interface or similar. Particularly, in some examples the values of total transmission power are measured at or close to the input to the antenna system. In this respect, the total output power of an antenna system, over all antenna elements of the antenna system, can be measured in the radio equipment, just before the antenna elements of the antenna system. In some examples this can be done by couplers that measure the radio signal amplitude at each signal path to an antenna element. These amplitudes can then be combined into a total output power of the radio equipment, with the antenna gain removed. This quantity is denoted $P_{tot}(t)$.

Figure 6:
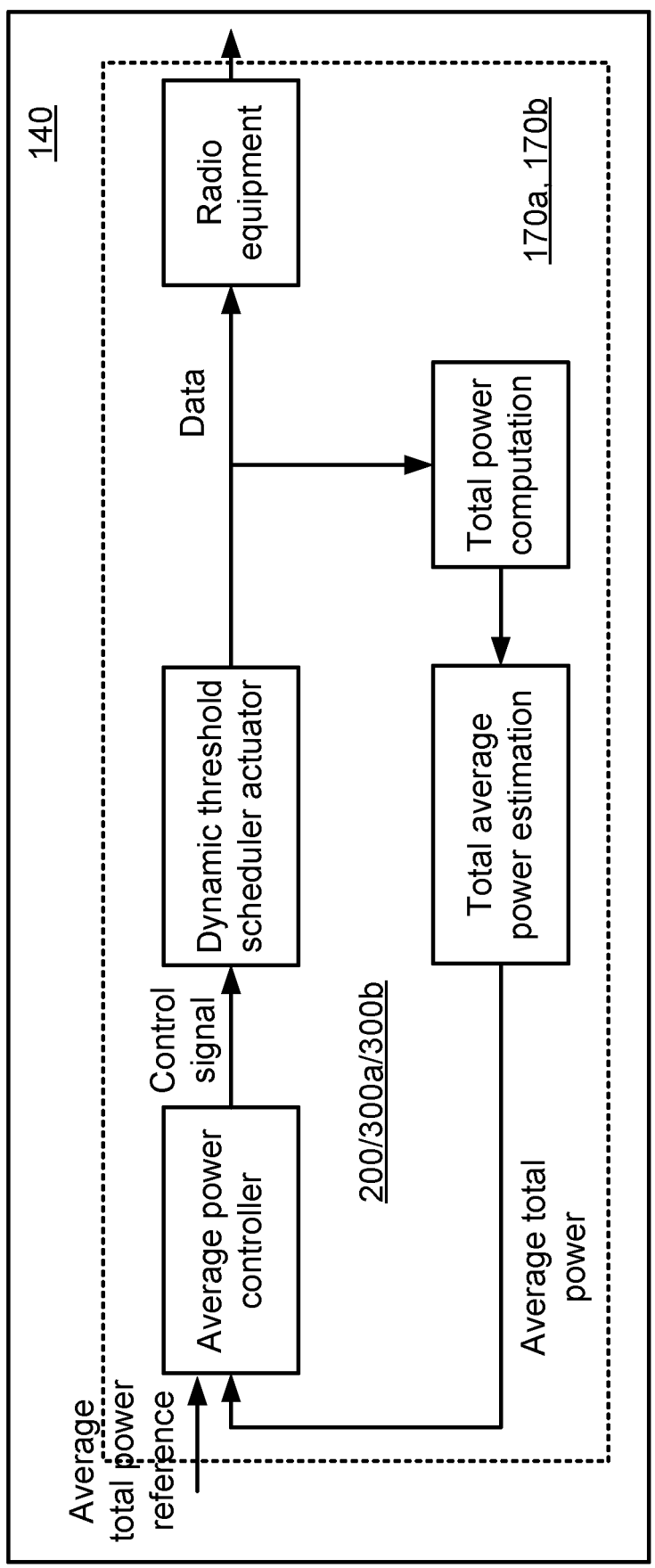

In other aspects the values of total transmission power $P_{tot}(t)$ are predicted. FIG. 6 illustrates an architecture of a site 140 where a predicted averaged total power is used. According to FIG. 6, an average power controller, a dynamic threshold scheduler actuator, a total average transmission power estimator, a total transmission power computer, and radio equipment that may be shared with other radio signal paths, are provided along a radio signal path. The radio equipment is separated from the remaining components over an interface, such as the C2 interface or similar. For example, the values of total transmission power $P_{tot}(t)$ can be predicted using information available in the scheduler or elsewhere in baseband. Such a quantity could be obtained, e.g. by summing up the momentary scheduled power as estimated by the fraction of resources used at each time instant t, over a small fraction of the averaging time T.

Depending on the implementation, different blocks of the control mechanism (as enclosed by the dotted rectangles in FIGS. 5 and 6) of the radio signal path may be implemented by each inner controller 300a, 300b. This could, for example, depending on whether the average power control feedback information is given as $P_{tot,i}(t)$, as $\langle P_{tot,i}\rangle(t)$, or as an activity factor, and whether the coordinating control information is given as $u_i(t)$ or as $\langle P_{tot,i}\rangle^{ref}(t)$. It does not matter whether any of these quantities are given in the Laplace domain or in the time domain.

Figure 7:
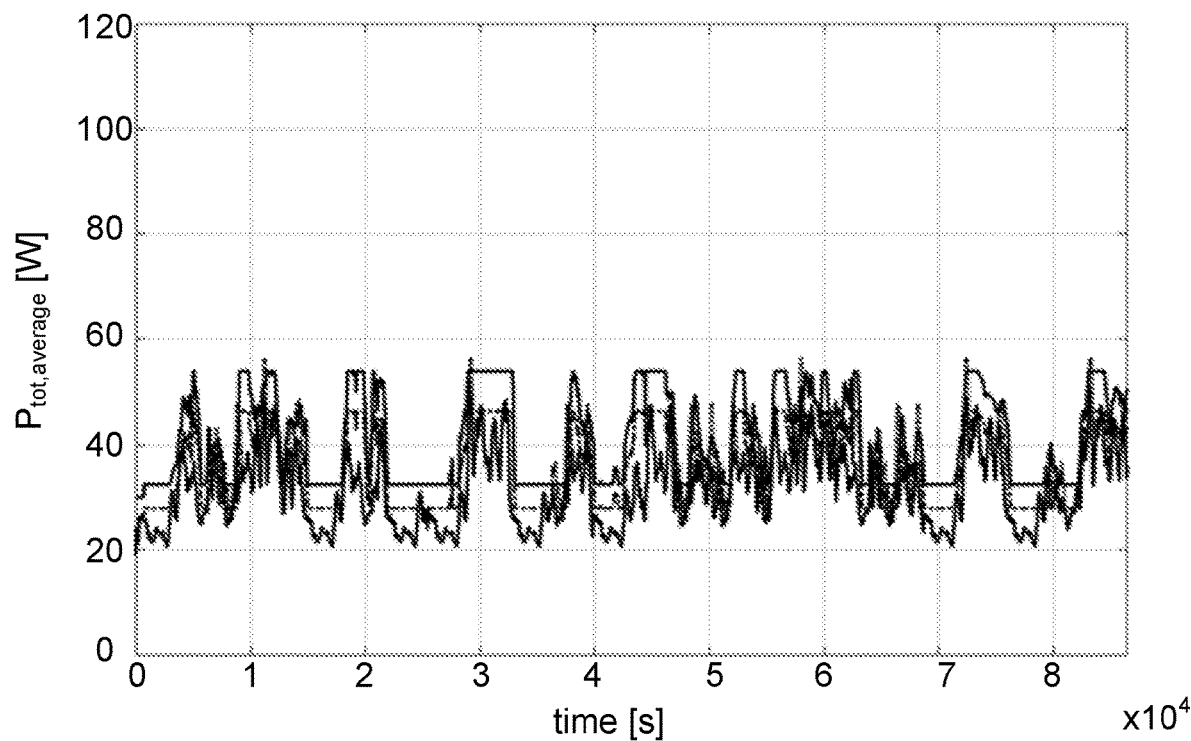
FIGS. 7, 8, 9, 10, and 11 show simulation results according to embodiments.
Figure 8:
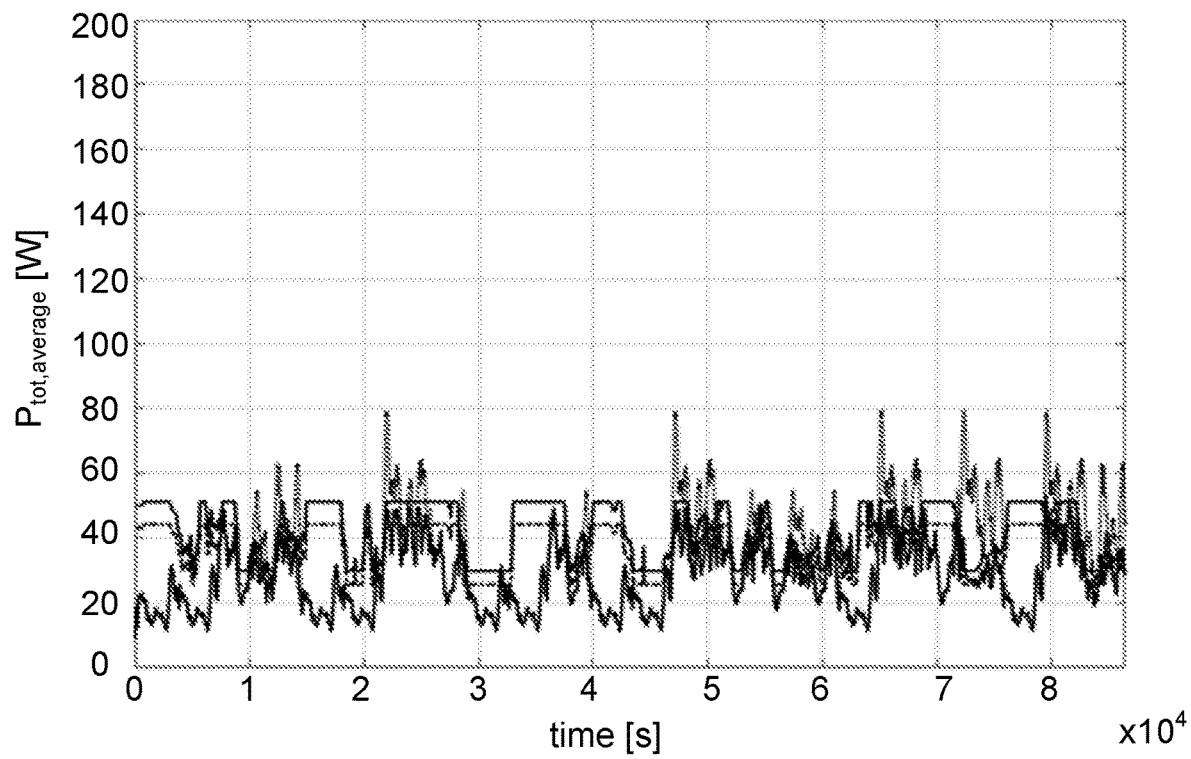
Figure 9:
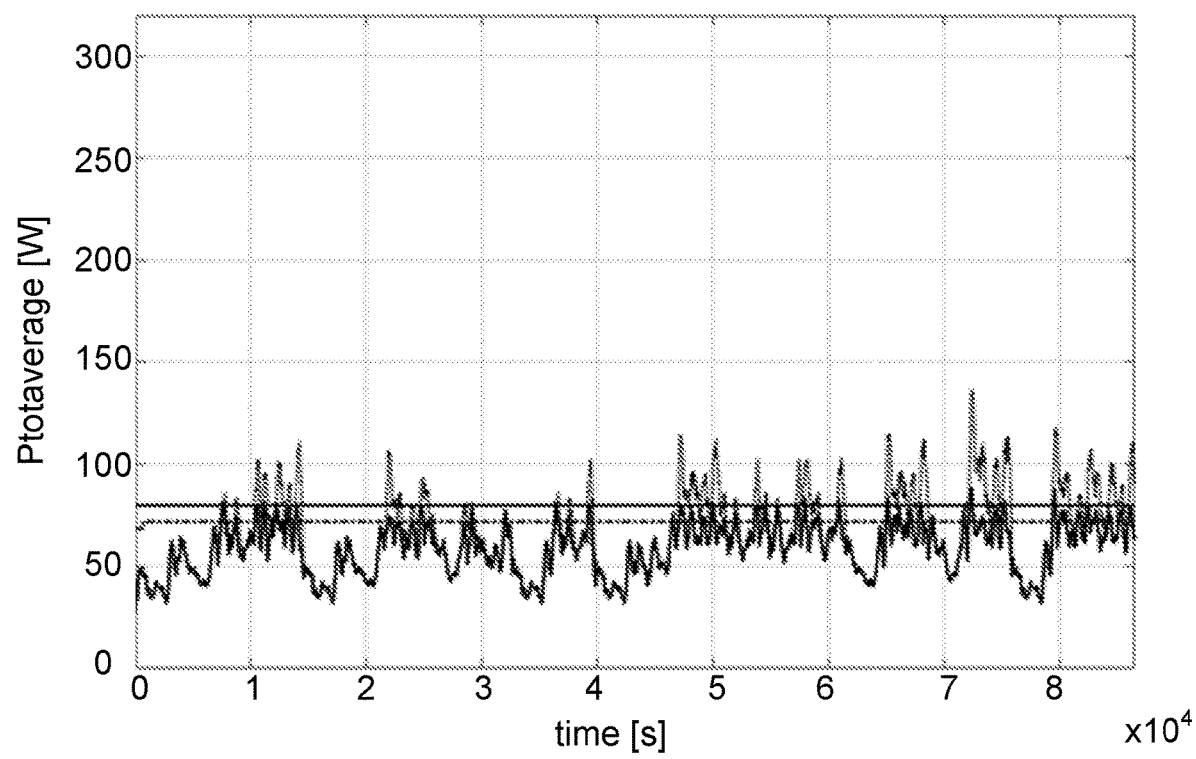

Simulation results of the herein disclosed embodiments will now be presented with reference to FIGS. 7, 8, and 9. The simulation results represent an embodiment where the site 140 comprises a first radio access network node using the NR air interface and a second radio access network node using the LTE air interface and thus an embodiment where there are two radio signal paths; a first radio signal path representing NR and a second radio signal path representing LTE. The following values of parameters were used: $P_{max,site,1}=200$ W, NR PDCCH, PDSCH power division, $P_{max,site,2}=120$ W, LTE PDCCH, PDSCH power division, $G_{max,site,1}=18$ dBi, and $G_{max,site,2}=18$ dBi. The following controller parameter settings were used: $\mu=0.25$, $\varepsilon=0.90$, $$\langle P \rangle_{EIRP,threshold} = 0.25 \cdot (200+120) \cdot 10^{\frac{18}{10}} = 5048 \text{ W } (ERIP),$$

$\beta_1=\beta_2=1.00$, $\xi_1=\xi_2=2.00$, T=6 minutes, and $\langle T \rangle$ =18 minutes.

FIG. 7 shows the result of average power control of the radio access network node using the LTE air interface (with $P_{max,site,2}=120$ W), FIG. 8 shows the result of average power control of the radio access network node using the NR air interface (with $P_{max,site,1}=200$ W), and FIG. 9 shows the result of joint average EIRP control of both radio access network nodes, with additive radio power combining. Dotted lines show uncontrolled momentary power, solid lines show controlled momentary power, the straight solid line is the computed average power or EIRP threshold, and the straight dashed dotted line is the reference value for the inner loops.

The reference values were limited based on scaling. As can be seen by studying the time variation of the power values of FIG. 7 and FIG. 8 it is clear that when one radio access network node experiences an increased power level, it "borrows" headroom from the other radio access network node (if possible). The result is a reduced need to limit the scheduled PRBs, which gives a throughput gain.

Figure 10:
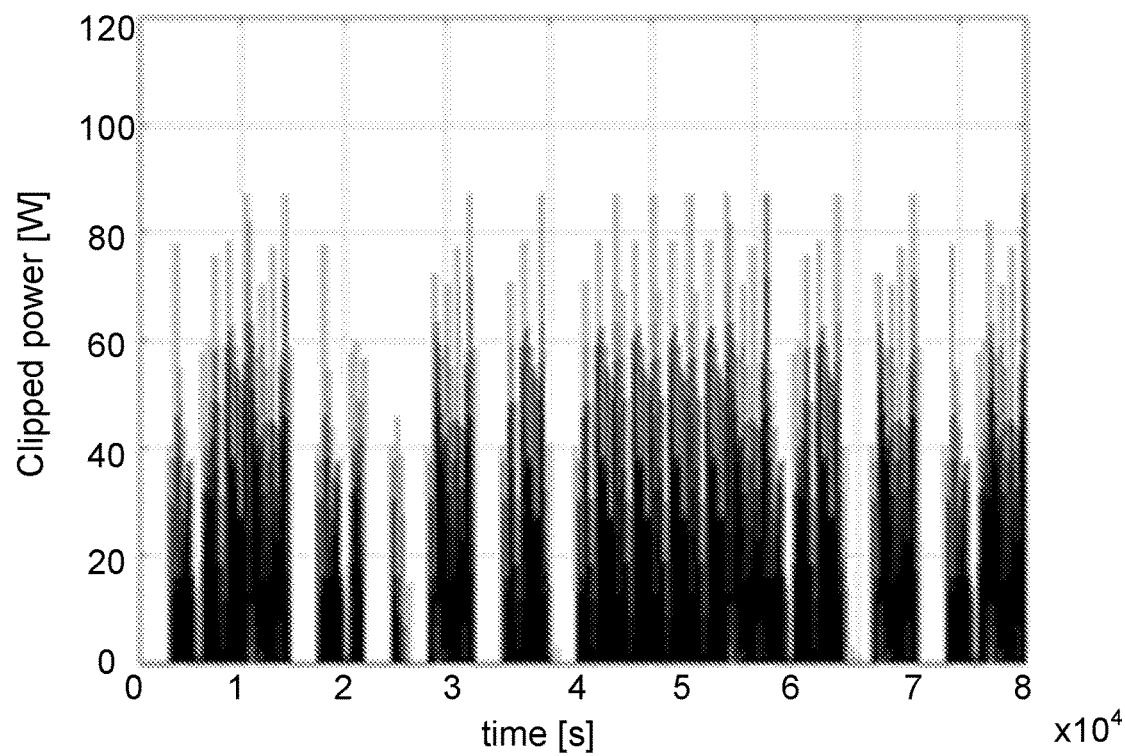
Figure 11:
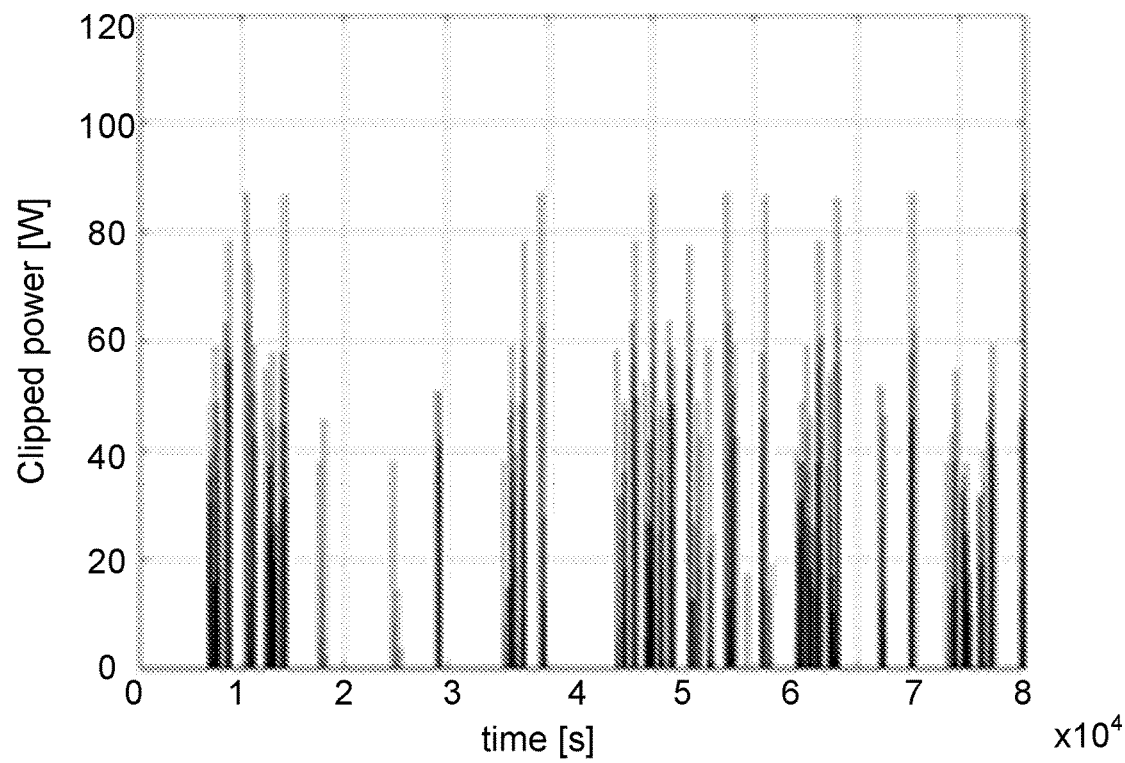

Further simulation results of the herein disclosed embodiments will now be presented with reference to FIGS. 10 and 11. The simulation results show the momentary limited power with throughput maximizing average EIRP control (as in FIG. 10) and without throughput maximizing average EIRP control (FIG. 11). In more detail, these figures enable a comparison of the amount of limited power, for a given radio signal path, without throughput maximizing average EIRP control (FIG. 10), to the case with throughput maximizing average EIRP control (FIG. 11). The coordinating controller 200 operates by equalizing the power limitation between the radio signal path and another radio signal path.

Figure 12:
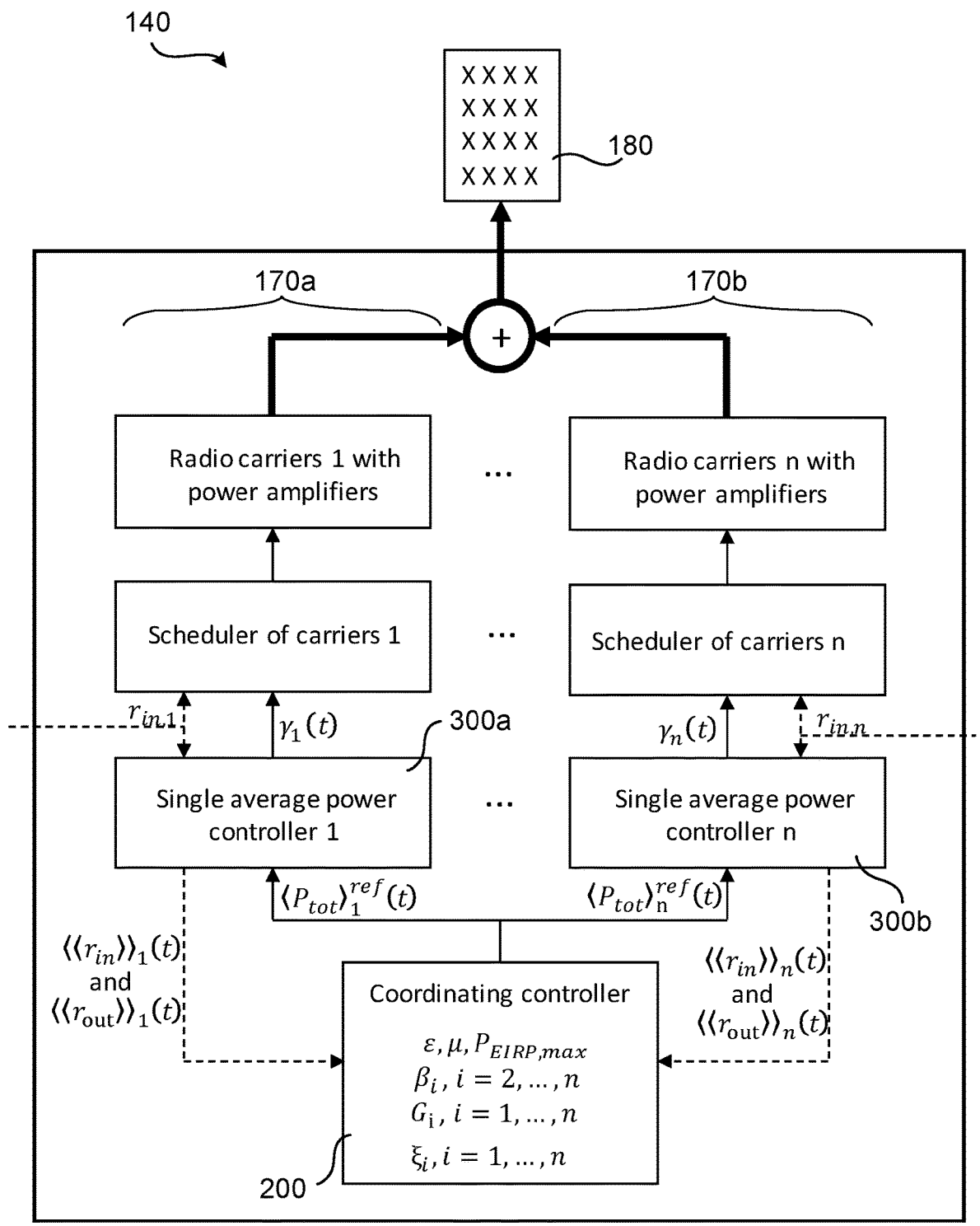
FIGS. 12 and 13 are block diagrams of sites according to embodiments.
Figure 13:
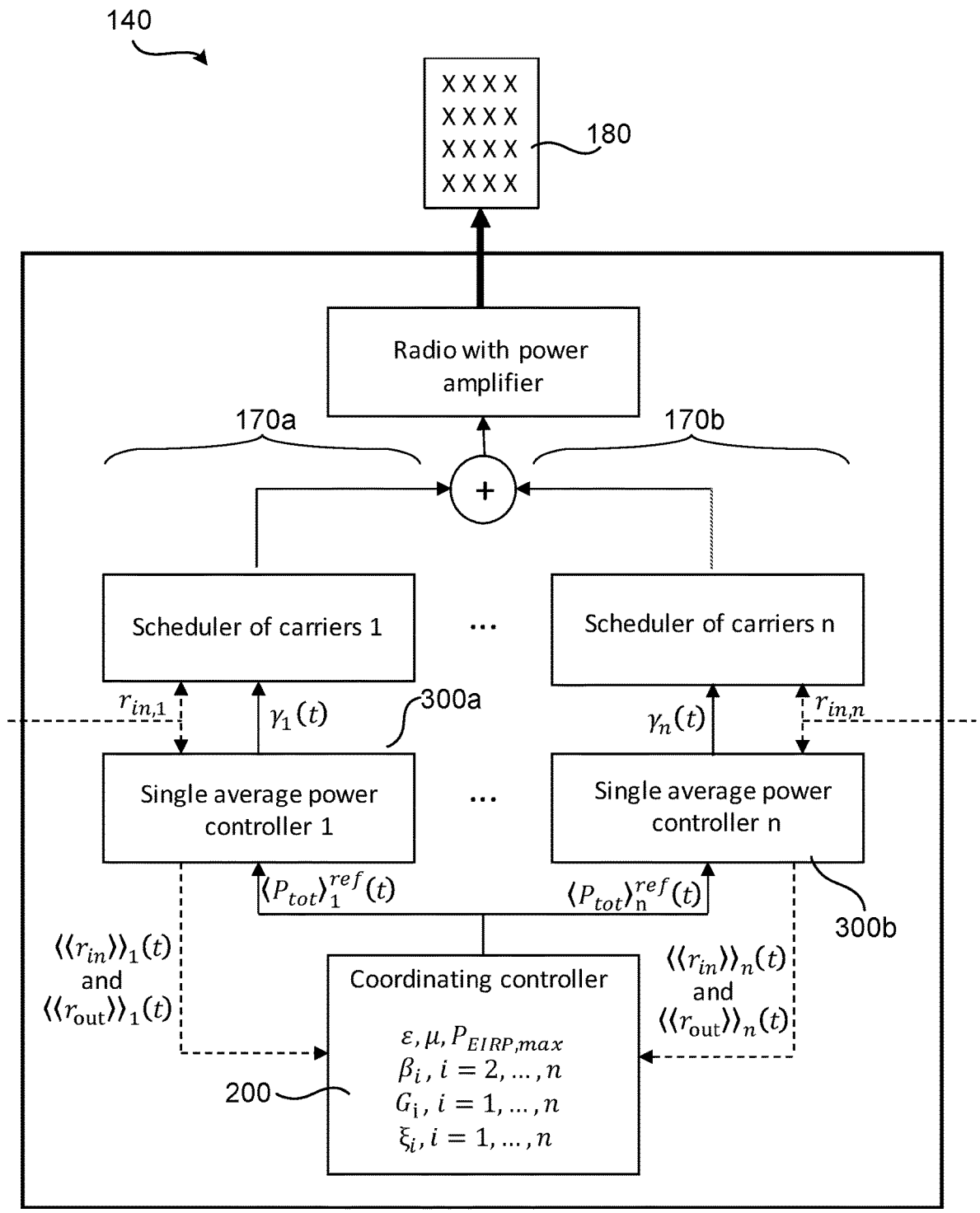

Some implementational examples and architectures, where the herein disclosed embodiments might be applied, will now be disclosed with reference to FIG. 12 and FIG. 13. The examples refer to the use of one single AAS. However, the examples cover at least also the use of closely co-sited and bore-sight aligned AASs.

FIG. 12 schematically illustrates a site 140 having an AAS 180. The AAS receives radio frequency signals that have been combined (summed) in a combiner after power amplification. The site 140 controls n sets of radio carriers, each radio carrier representing a respective radio signal path 170a, 170b, with power amplifiers. Each set of radio carriers is scheduled by a separate scheduler and produces input radio signals to the combiner. A respective inner controller 300a, 300b is provided to control the average power for each set of radio carriers. Each inner controller 300a, 300b accept a time varying power average reference value, determined by a coordinating controller 200. The coordinating controller 200 might either reside in the site 140, or might be located elsewhere (not shown) and then be operatively connected to the site 140. Each inner controller 300a, 300b receives information of long-term time averaged incoming and outgoing traffic $\langle\langle r_{in}\rangle\rangle_i$, $\langle\langle r_{out}\rangle\rangle_i$ for its set of carriers, obtain a time varying reference value $\langle P_{tot}\rangle_i^{ref}(t)$ of transmission power for its set of carriers, and performs average EIRP control of its carriers as described above. The coordinating controller 200 receives the information of long-term time averaged incoming and outgoing traffic $\langle\langle r_{in}\rangle\rangle_i$, $\langle\langle r_{out}\rangle\rangle_i$ from each inner controller 300a, 300b and uses this information, together with pre-computed and pre-configured parameters, to compute a time varying reference value $\langle P_{tot}\rangle_i^{ref}(t)$ of transmission power for each of the inner controllers 300a, 300b. The computation might be performed repeatedly with uniform sampling. In response to receiving the reference values, the inner controllers 300a, 300b might also adjust internal thresholds.

According to a first alternative of FIG. 12, the site 140 comprises two or more radio access network nodes, all using the same RAT and each producing its own radio signals that are fed to the AAS. Each radio access network node thus represents a respective one of the radio signal paths 170a, 170b.

According to a second alternative of FIG. 12, the site 140 comprises two or more radio access network nodes of two or more different RATs, each radio access network node producing its own radio signals that are fed to the AAS. Each radio access network node thus represents a respective one of the radio signal paths 170a, 170b. For example, a first radio access network node of the site 140, and thus a first 170a of the radio signal paths 170a, 170b, might be configured for transmission over the LTE air interface and a second radio access network node of the site 140, and thus a second 170b of the radio signal paths 170a, 170b, might be configured for transmission over the NR air interface. One LTE node and one NR node might thus be operatively connected to one and the same AAS. The AAS receives radio signals that are combined (summed) after power amplification. Each of the LTE node and the NR node controls a power amplifier and at least one respective scheduler producing input signals for power amplification. The LTE node and the NR node might share a common time/frequency resource grid or have separate time/frequency resource grids.

According to a third alternative of FIG. 12, the site comprises a single radio access network node, such as an LTE node or an NR node, having k schedulers, where each scheduler is configured to schedule a set of carriers. Each carrier thus represents a respective one of the radio signal paths 170a, 170b. The contributions from each set of carriers are amplified after which they are combined for transmission in the AAS. The carriers share a set of n overlapping beam directions. Single average EIRP control is applied in each beam direction, for each scheduler. The site 140 is equipped with n individual controllers 300a, 300b, each providing coordinating MIMO average EIRP back-off control for one single beam direction and each inner controller 300a, 300b being controlled by one and the same coordinating controller 200.

According to a fourth alternative of FIG. 12, the site 140 comprises two or more radio access network nodes of the same type, such as two or more LTE nodes or two or more NR nodes, each having a scheduler where each scheduler is configured to schedule a set of carriers. Each carrier thus represents a respective one of the radio signal paths 170a, 170b. The contributions from each radio access network node are amplified after which they are combined for transmission in the AAS. The carriers share a set of n overlapping beam directions. Single average EIRP control is applied in each beam direction, for each scheduler. The site 140 is equipped with n individual controllers 300a, 300b, each providing coordinating MIMO average EIRP back-off control for one single beam direction and each inner controller 300a, 300b being controlled by one and the same coordinating controller 200.

FIG. 13 illustrates a site 140, also with an AAS 180, similar to the one in FIG. 12, with the difference that in the site 140 of FIG. 13 the signals from each set of carriers, where each radio carrier represents a respective radio signal path 170a, 170b, are combined in the baseband domain, after which the combined signal is power amplified and provided to the AAS. Each carrier is controlled by a respective inner controller 300a, 300b, and each inner controller 300a, 300b being controlled by one and the same coordinating controller 200. This alternative is thus similar to FIG. 12 but where the radio access network nodes share RF circuitry where the combining and power amplification is performed. The RF circuitry might be separately provided or provided in one of the radio access network nodes.

According to a first alternative of FIG. 13, the site 140 comprises two or more radio access network nodes, each producing its own radio signal. The signals from each radio access network node, where each radio access network node represents a respective radio signal path 170a, 170b, are combined in the baseband domain, after which the combined signal is power amplified and provided to the AAS. Each radio access network node is controlled by a respective inner controller 300a, 300b, and each inner controller 300a, 300b being controlled by one and the same coordinating controller 200. This alternative is thus similar to the first alternative of FIG. 12 but where the radio access network nodes share RF circuitry where the combining and power amplification is performed. The RF circuitry might be separately provided or provided in one of the radio access network nodes.

According to a second alternative of FIG. 13, the site 140 comprises two or more radio access network nodes of two or more different RATs, each radio access network node producing its own signal. The signals from each radio access network node, where each radio access network node represents a respective radio signal path 170a, 170b, are combined in the baseband domain, after which the combined signal is power amplified and provided to the AAS. Each radio access network node is controlled by a respective inner controller 300a, 300b, and each inner controller 300a, 300b being controlled by one and the same coordinating controller 200. For example, a first radio access network node of the site 140, and thus a first 170a of the radio signal paths 170a, 170b, might be configured for transmission over the LTE air interface and a second radio access network node of the site 140, and thus a second 170b of the radio signal paths 170a, 170b, might be configured for transmission over the NR air interface. This alternative is thus similar to the second alternative of FIG. 12 but where the radio access network nodes share RF circuitry where the combining and power amplification is performed. The RF circuitry might be separately provided or provided in one of the radio access network nodes.

According to a third alternative of FIG. 13, the site 140 comprises two or more radio access network nodes of two or more different RATs, each radio access network node producing its own signal. The signals from each radio access network node, where each radio access network node represents a respective radio signal path 170a, 170b, are combined in the baseband domain, after which the combined signal is power amplified and provided to the AAS. A first radio access network node of the site 140, and thus a first radio signal path 170a of the radio signal paths 170a, 170b, might be configured for transmission over the LTE air interface and a second radio access network node of the site 140, and thus a second radio signal path 170b of the radio signal paths 170a, 170b, might be configured for transmission over the NR air interface. One LTE node and one NR node might thus be operatively connected to one and the same AAS. In some examples the LTE node and the NR node share one and the same time/frequency resource grid. Alternatively, there is one or more time/frequency resource grids per radio access network node, such as one time/frequency resource grid provided per MU-MIMO layer. The time/frequency resources for each of the radio access network nodes are scheduled by respective schedulers, i.e. one scheduler per radio access network node. Each scheduler is controlled by a respective inner controller 300a, 300b, and each inner controller 300a, 300b being controlled by one and the same coordinating controller 200. The signals from each radio access network node, where the signals are defined by the time/frequency resources allocated by each of the radio access network nodes, are combined in the baseband domain, after which the combined signal is power amplified and provided to the AAS.

According to a fourth alternative of FIG. 13, the site 140 comprises a single radio access network node, such as an LTE node or an NR node, having k schedulers, where each scheduler is configured to schedule a set of carriers. Each carrier thus represents a respective one of the radio signal paths 170a, 170b. The signals from each radio access network node, where each radio access network node represents a respective radio signal path 170a, 170b, are combined in the baseband domain, after which the combined signal is power amplified and provided to the AAS. Each radio access network node is controlled by a respective inner controller 300a, 300b, and each inner controller 300a, 300b being controlled by one and the same coordinating controller 200. This alternative is thus similar to the third alternative of FIG. 12 but where the radio access network nodes share RF circuitry where the combining and power amplification is performed. The RF circuitry might be separately provided or provided in one of the radio access network nodes.

According to a fifth alternative of FIG. 13, the site 140 comprises two or more radio access network nodes of the same type, such as two or more LTE nodes or two or more NR nodes, each having a scheduler where each scheduler is configured to schedule a set of carriers. Each carrier thus represents a respective one of the radio signal paths 170a, 170b. The signals from each carrier, where each carrier represents a respective radio signal path 170a, 170b, are combined in the baseband domain, after which the combined signal is power amplified and provided to the AAS. The carriers share a set of n overlapping beam directions. Single average EIRP control is applied in each beam direction, for each scheduler. The site 140 is equipped with n individual controllers 300a, 300b, each providing coordinating MIMO average EIRP back-off control for one single beam direction and each inner controller 300a, 300b being controlled by one and the same coordinating controller 200. This alternative is thus similar to the fourth alternative of FIG. 12 but where the radio access network nodes share RF circuitry where the combining and power amplification is performed. The RF circuitry might be separately provided or provided in one of the radio access network nodes.

According to a sixth alternative of FIG. 13, the site 140 comprises a single radio access network node, such as an LTE node or an NR node, having k schedulers, where each scheduler is configured to schedule its own service. In some examples one scheduler serves LTE or NR traffic whilst another scheduler serves NB-IoT traffic. In other examples, one scheduler serves LTE or NR traffic whilst another scheduler serves CAT-M traffic. The LTE or NR traffic on the one hand and the NB-IoT traffic or CAT-M traffic on the other hand share one and the same time/frequency resource grid.

The time/frequency resources for each of the services are scheduled by the respective schedulers. Each scheduler is controlled by a respective inner controller 300a, 300b, and each inner controller 300a, 300b being controlled by one and the same coordinating controller 200. The signals from each radio access network node, where the signals are defined by the time/frequency resources allocated by each of the services, are combined in the baseband domain, after which the combined signal is power amplified and provided to the AAS.

Figure 14:
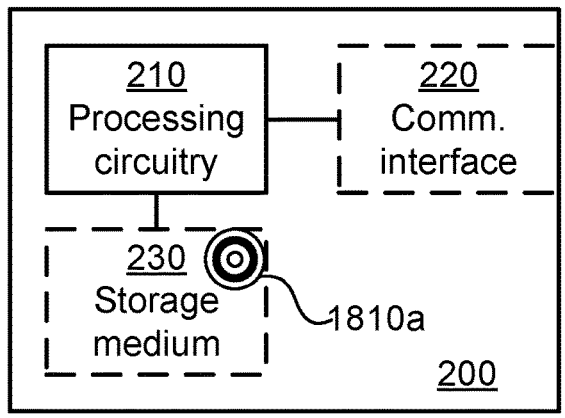
FIG. 14 is a schematic diagram showing functional units of a coordinating controller according to an embodiment.

FIG. 14 schematically illustrates, in terms of a number of functional units, the components of a coordinating controller 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1810a (as in FIG. 18), e.g. in the form of a storage medium 230. The processing circuitry 210 may further be provided as at least one application specific integrated circuit (ASIC), or field programmable gate array (FPGA).

Particularly, the processing circuitry 210 is configured to cause the coordinating controller 200 to perform a set of operations, or steps, as disclosed above. For example, the storage medium 230 may store the set of operations, and the processing circuitry 210 may be configured to retrieve the set of operations from the storage medium 230 to cause the coordinating controller 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The coordinating controller 200 may further comprise a communications interface 220 for communications with other entities, functions, nodes, and devices, such as the inner controllers 300a, 300b. As such the communications interface 220 may comprise one or more transmitters and receivers, comprising analogue and digital components.

The processing circuitry 210 controls the general operation of the coordinating controller 200 e.g. by sending data and control signals to the communications interface 220 and the storage medium 230, by receiving data and reports from the communications interface 220, and by retrieving data and instructions from the storage medium 230. Other components, as well as the related functionality, of the coordinating controller 200 are omitted in order not to obscure the concepts presented herein.

Figure 15:
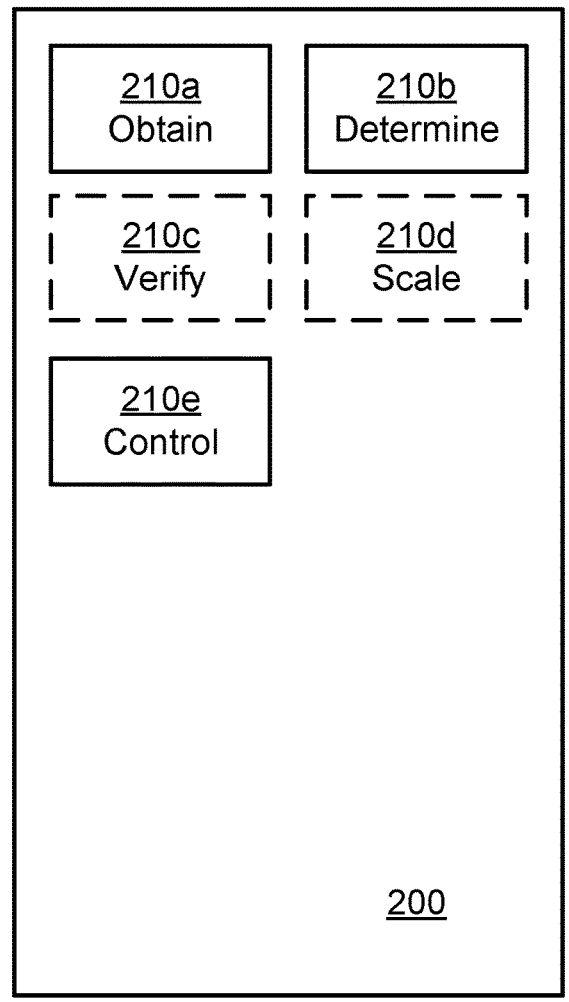
FIG. 15 is a schematic diagram showing functional modules of a coordinating controller according to an embodiment.

FIG. 15 schematically illustrates, in terms of a number of functional modules, the components of a coordinating controller 200 according to an embodiment. The coordinating controller 200 of FIG. 15 comprises a number of functional modules an obtain module 210a configured to perform step S102, a determine module 210b configured to perform step S104, and a control module 210C configured to perform step S110. The coordinating controller 200 of FIG. 15 may further comprise a number of optional functional modules, such as any of a verify module 210C configured to perform step S106 and a scale module 21od configured to perform step S108. In general terms, each functional module 210a-210e may be implemented in hardware or in software. Preferably, one or more or all functional modules 210a-210e may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210e and to execute these instructions, thereby performing any steps of the coordinating controller 200 as disclosed herein.

Figure 16:
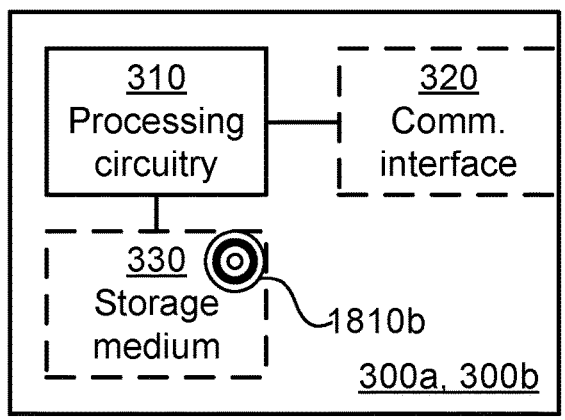
FIG. 16 is a schematic diagram showing functional units of an inner controller according to an embodiment.

FIG. 16 schematically illustrates, in terms of a number of functional units, the components of an inner controller 300a, 300b according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1810b (as in FIG. 18), e.g. in the form of a storage medium 330. The processing circuitry 310 may further be provided as at least one application specific integrated circuit (ASIC), or field programmable gate array (FPGA).

Particularly, the processing circuitry 310 is configured to cause the inner controller 300a, 300b to perform a set of operations, or steps, as disclosed above. For example, the storage medium 330 may store the set of operations, and the processing circuitry 310 may be configured to retrieve the set of operations from the storage medium 330 to cause the inner controller 300a, 300b to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The inner controller 300a, 300b may further comprise a communications interface 320 for communications with other entities, functions, nodes, and devices, such as the coordinating controller 200. As such the communications interface 320 may comprise one or more transmitters and receivers, comprising analogue and digital components.

The processing circuitry 310 controls the general operation of the inner controller 300a, 300b e.g. by sending data and control signals to the communications interface 320 and the storage medium 330, by receiving data and reports from the communications interface 320, and by retrieving data and instructions from the storage medium 330. Other components, as well as the related functionality, of the inner controller 300a, 300b are omitted in order not to obscure the concepts presented herein.

Figure 17:
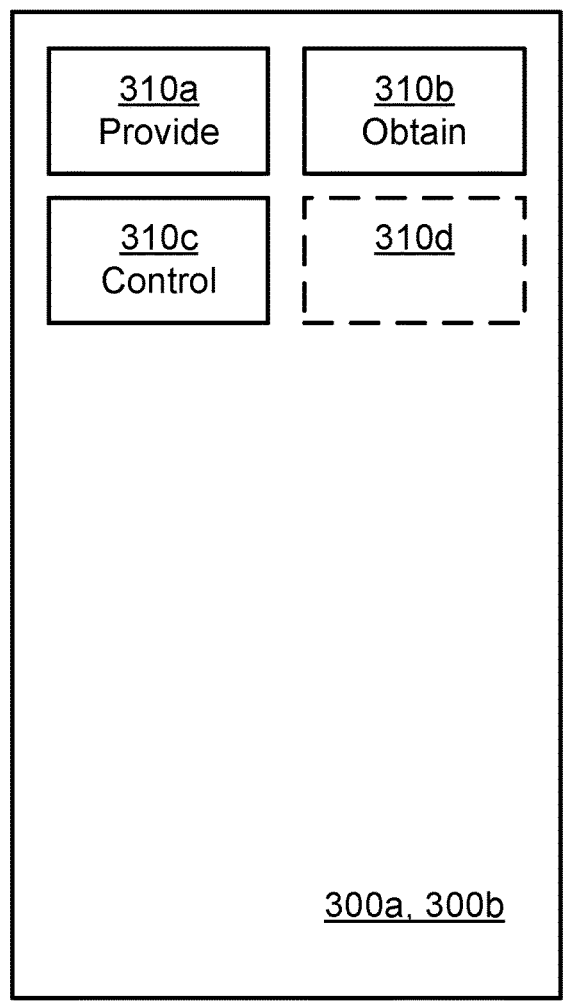
FIG. 17 is a schematic diagram showing functional modules of an inner controller according to an embodiment.

FIG. 17 schematically illustrates, in terms of a number of functional modules, the components of an inner controller 300a, 300b according to an embodiment. The inner controller 300a, 300b of FIG. 17 comprises a number of functional modules; a provide module 310a configured to perform step S202, an obtain module 310b configured to perform step S204, and a control module 310c configured to perform step S206. The inner controller 300a, 300b of FIG. 17 may further comprise a number of optional functional modules, as represented by functional module 310d. In general terms, each functional module 310a-310d may be implemented in hardware or in software. Preferably, one or more or all functional modules 310a-310d may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310d and to execute these instructions, thereby performing any steps of the inner controller 300a, 300b as disclosed herein.

Each of the coordinating controller 200 and inner controller 300a, 300b may be provided as a standalone device or as a part of a respective at least one further device. For example, the coordinating controller 200 and the inner controller 300a, 300b may be provided in a node of the radio access network or in a node of the core network. Alternatively, functionality of the coordinating controller 200 and the inner controller 300a, 300b may be distributed between at least two devices, or nodes. These at least two nodes, or devices, may either be part of the same network part (such as the radio access network or the core network) or may be spread between at least two such network parts. In general terms, the functionality of the coordinating controller 200 may be implemented in one of the sites 140 or even in the core network whereas the functionality of the inner controller 300a, 300b may be implemented in each of the sites 140.

Thus, a first portion of the instructions performed by the coordinating controller 200 and the inner controller 300a, 300b may be executed in a respective first device, and a second portion of the instructions performed by the coordinating controller 200 and the inner controller 300a, 300b may be executed in a respective second device; the herein disclosed embodiments are not limited to any particular number of devices on which the instructions performed by the coordinating controller 200 and the inner controller 300a, 300b may be executed. Hence, the methods according to the herein disclosed embodiments are suitable to be performed by a coordinating controller 200 and/or inner controller 300a, 300b residing in a cloud computational environment. Therefore, although a single processing circuitry 210, 310 is illustrated in FIGS. 14 and 16 the processing circuitry 210, 310 may be distributed among a plurality of devices, or nodes. The same applies to the functional modules 210a-210e, 310a-310d of FIGS. 15 and 17 and the computer programs 1820a, 1820b of FIG. 18.

Figure 18:
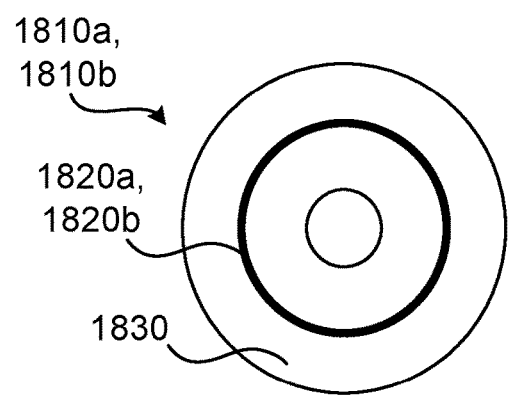
FIG. 18 shows one example of a computer program product comprising computer readable means according to an embodiment.

FIG. 18 shows one example of a computer program product 1810a, 1810b comprising computer readable means 1830. On this computer readable means 1830, a computer program 1820a can be stored, which computer program 1820a can cause the processing circuitry 210 and thereto operatively coupled entities and devices, such as the communications interface 220 and the storage medium 230, to execute methods according to embodiments described herein. The computer program 1820a and/or computer program product 1810a may thus provide means for performing any steps of the coordinating controller 200 as herein disclosed. On this computer readable means 1830, a computer program 1820b can be stored, which computer program 1820b can cause the processing circuitry 310 and thereto operatively coupled entities and devices, such as the communications interface 320 and the storage medium 330, to execute methods according to embodiments described herein. The computer program 1820b and/or computer program product 1810b may thus provide means for performing any steps of the inner controller 300a, 300b as herein disclosed.

In the example of FIG. 18, the computer program product 1810a, 1810b is illustrated as an optical disc, such as a CD (compact disc) or a DVD (digital versatile disc) or a Blu-Ray disc. The computer program product 1810a, 1810b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1820a, 1820b is here schematically shown as a track on the depicted optical disk, the computer program 1820a, 1820b can be stored in any way which is suitable for the computer program product 1810a, 1810b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for average Equivalent Isotropic Radiated Power (EIRP) control of at least two radio signal paths, the method being performed by a coordinating controller of a site, the site comprising the at least two radio signal paths, the method comprising:
obtaining, from inner controllers of the at least two radio signal paths, information of long-term time averaged incoming and outgoing traffic per radio signal path;
determining a time varying reference value of average transmission power per radio signal path based on equalizing terms determined from the information of long-term time averaged incoming and outgoing traffic, antenna gain information per radio signal path, and a condition on total average EIRP for the site; and
performing individual average EIRP control per radio signal path by providing to each respective inner controller, the time varying reference value determined for the radio signal path controlled by that inner controller.

2. The method according to claim 1, wherein the equalizing terms are determined according to a control objective to minimize overall throughput loss of the site.

3. The method according to claim 1, wherein the equalizing terms further are determined from a factor $\mu$ for the site.

4. The method according to claim 1, wherein the equalizing terms further are determined from a control headroom factor $\varepsilon$ for the site.

5. The method according to claim 4, wherein the condition on total average EIRP for the site is given in terms of the control headroom factor $\varepsilon$, a factor $\mu$ for the site, and a requirement $P_{EIRP,max}$ on momentary EIRP for the site.

6. The method according to claim 1, wherein the equalizing terms further are determined from constant weights $\beta_i$ per radio path.

7. The method according to claim 1, wherein the equalizing terms further are determined from scale factors $\xi_i$ per radio path.

8. The method according to claim 1, further comprising:
verifying that a sum of all determined time varying reference values of transmission power per all radio signal paths of the site fulfils an average EIRP constraint.

9. The method according to claim 8, further comprising:
scaling, when the sum fails to fulfil the average EIRP constraint, at least one of the determined time varying reference values with a scaling parameter.

10. The method according to claim 9, wherein said at least one of the determined time varying reference values is repeatedly scaled, with an updated scaling parameter per each time said at least one of the determined time varying reference values is scaled, until the sum fulfils the average EIRP constraint.

11. The method according to claim 9, wherein the scaling parameter for time varying reference values of transmission power per radio signal path m is based on the determined time varying reference values of transmission power per all other radio signal paths of the site, and the total average EIRP for the site.

12. The method according to claim 1, wherein the site is equipped with one, or multiple co-sited and bore sight aligned advanced antenna systems (AASs), each AAS being configured to transmit radio power as provided from a respective at least one of the at least two radio signal paths.

13. The method according to claim 1, wherein each radio signal path is associated with a respective carrier, or set of carriers, as transmitted by the site.

14. The method according to claim 13, wherein signals from each carrier, or set of carriers, as transmitted by the site are converted to radio frequency at one radio frequency converter module per radio signal path before being fed to an advanced antenna system (AAS).

15. The method according to claim 13, wherein signals from all carriers, or sets of carriers, as transmitted by the site are combined at baseband and converted to radio frequency at a common radio frequency converter module before being fed to an advanced antenna system (AAS).

16. The method according to claim 1, wherein each radio signal path is associated with a respective scheduler of the site.

17. The method according to claim 1, wherein each radio signal path is associated with a respective radio access network node of the site.

18. The method according to claim 1, wherein at least one of the at least two radio signal paths is configured for a first radio access technology (RAT), and wherein at least one other of the at least two radio signal paths is configured for a second RAT different from the first RAT.

19. A coordinating controller for average Equivalent Isotropic Radiated Power (EIRP) control of at least two radio signal paths of a site, the coordinating controller comprising:

processing circuitry; and
a storage medium containing instructions which, when executed by the processing circuitry, cause the coordinating controller to:
obtain, from inner controllers of the at least two radio signal paths, information of long-term time averaged incoming and outgoing traffic per radio signal path;
determine a time varying reference value of average transmission power per radio signal path based on equalizing terms determined from the information of long-term time averaged incoming and outgoing traffic, antenna gain information per radio signal path, and a condition on total average EIRP for the site; and
perform individual average EIRP control per radio signal path by providing to each respective inner controller, the time varying reference value determined for the radio signal path controlled by that inner controller.

20. A non-transitory computer-readable storage medium having stored thereon a program comprising instructions which, when executed by a processor of a coordinating controller of a site, cause the coordinating controller to control average Equivalent Isotropic Radiated Power (EIRP) of at least two radio signal paths by performing operations comprising:
obtaining, from inner controllers of the at least two radio signal paths, information of long-term time averaged incoming and outgoing traffic per radio signal path;
determining a time varying reference value of average transmission power per radio signal path based on equalizing terms determined from the information of long-term time averaged incoming and outgoing traffic, antenna gain information per radio signal path, and a condition on total average EIRP for the site; and
performing individual average EIRP control per radio signal path by providing to each respective inner controller, the time varying reference value determined for the radio signal path controlled by that inner controller.

* * * * *